United States Patent [19]
Watkins et al.

[11] Patent Number: 5,161,162
[45] Date of Patent: Nov. 3, 1992

[54] METHOD AND APPARATUS FOR SYSTEM BUS TESTABILITY THROUGH LOOPBACK

[75] Inventors: John Watkins, Sunnyvale; William C. Van Loo, Palo Alto; Kurt Michels, Tracy; Hugh Chang, Los Angeles, all of Calif.

[73] Assignee: Sun Microsystems, Inc., Mountain View, Calif.

[21] Appl. No.: 508,779

[22] Filed: Apr. 12, 1990

[51] Int. Cl.⁵ .............................................. G06F 11/00
[52] U.S. Cl. .................................. 371/29.5; 364/267; 364/267.4; 364/DIG. 1; 371/20.5
[58] Field of Search ................... 371/29.5, 20.5, 15.1; 364/200, 900

[56] References Cited

U.S. PATENT DOCUMENTS

| | | | |
|---|---|---|---|
| 4,575,792 | 3/1986 | Keeley | 364/200 |
| 4,730,313 | 3/1988 | Stephenson | 371/20.5 X |
| 4,858,234 | 8/1989 | Hartwell | 364/900 X |
| 4,972,345 | 11/1990 | Munier | 371/295 |

FOREIGN PATENT DOCUMENTS

| | | | |
|---|---|---|---|
| 55436 | 4/1982 | Japan | 371/29.5 |
| 35624 | 3/1983 | Japan | 371/29.5 |
| 45563 | 3/1984 | Japan | 371/29.5 |

OTHER PUBLICATIONS

"Bidirectional Interface Test Circuit", IBM TDB, vol. 28, No. 3, Aug. 1985, pp. 1073-1074.

*Primary Examiner*—Robert W. Beausoliel
*Attorney, Agent, or Firm*—Blakely Sokoloff Taylor & Zafman

[57] ABSTRACT

A workstation or server having a central processing unit (CPU) and a standard system bus interface and loopback control logic. The I/O subsystem is tested through the application of diagnositc programs running in the CPU which use programmed I/O bus cycles to read and write from the standard system bus interface. In this way, the CPU, with the loopback test mode enabled, can functionally test data paths and controls utilized to perform programmed I/O accesses to the standard system bus interface without having to access an external system bus device. Furthermore, a loopback bus cycle can cause a direct virtual memory access (DVMA) bus cycle to be created at the system bus interface. Therefore, the CPU, with the loopback test mode enabled, can also functionally test data paths and controls utilized to perform system memory DVMA without the presence of an external system bus device.

17 Claims, 17 Drawing Sheets

METHOD AND APPARATUS FOR SYSTEM BUS TESTABILITY THROUGH LOOPBACK

SUMMARY OF THE INVENTION

In a Unix based workstation or server, the testability of a standard system bus, and the I/O subsystem to which this bus is attached, can be improved by the addition of "loopback" bus control logic. In a typical workstation configuration, the major system components include a Central Processing Unit (CPU), a Memory Management Unit (MMU), an optional Cache subsystem, Main Memory, and an Input/Output (I/O) subsystem for transfering data between the memory subsystem (Cache and Main Memory) and external devices. The operating system for such a workstation or server may be the Unix (R) operating system, which is presumed in the present implementation. (Unix is a registered trademark of the ATT Corp.) The I/O subsystem described here supports external devices with at least two types of device interfaces: a standard system bus interface and a network control interface. The standard system bus is typically capable of supporting a variety of devices, including disk controllers, as one example.

"Loopback" bus control logic takes advantage of the fact that a standard system bus interface is typically both a bus master interface and a bus slave interface. Control of data movement between external devices on a standard system bus and the main memory subsystem is typically done in either of two ways. First, data movement can be controlled by the CPU directly reading from the device (to internal CPU registers) or writing from the CPU to the device through a standard system bus master interface. This type of control is called Programmed I/O. The second type of control is with data movement being controlled, for the most part, by the external device itself through a standard system bus slave interface. This type of control is called Direct Memory Access, or, if the device accesses memory through virtual addresses (as is the case in the present embodiment), Direct Virtual Memory Access (DVMA). Coordination between the external device and the CPU is typically handled either by message passing or through interrupts.

In typical workstations or servers with a standard system bus for external I/O devices, the logic to control the I/O subsystem, together with the I/O subsystem data paths, can only be tested effectively by adding external devices on the system bus and exercising these devices through the standard system bus slave interface. With the loopback bus control logic and supporting software, the I/O subsystem is tested through the application of diagnostic programs running in the CPU. The diagnostic program accomplishes this through the use of "Programmed I/O" bus cycles to read and write from the standard system bus master interface.

While in "loopback" mode, these bus cycles can exercise controls and data paths within the system in either of two ways, depending on the mode of operation. In the present implementation, two control bits, set by the CPU within system control registers, select these modes of operation. First, a "Loopback Enable" bit enables the loopback test mode within the hardware, for all read and write bus cycles to the standard system bus interface. When "Loopback Enable" is active on programmed I/O write bus cycles, the data from the CPU is captured at the system bus interface buffers by loopback control logic. When "Loopback Enable" is active on programmed I/O read bus cycles, data at the system bus interface is read back to the CPU, without having to access an external system bus device.

The second loopback control bit, the "DVMA Enable" bit, controls how the data and bus controls for loopback bus cycles are handled. If the "DVMA Enable" bit is inactive, loopback bus cycles from the CPU simply cause data to be written to and read from the system bus buffers at the bus interface. If the "DVMA Enable" bit is set active with "Loopback Enable", then a single DVMA bus cycle will be created at the system bus interface in response to each loopback bus cycle initiated by the CPU. That is, a loopback write bus cycle from the CPU causes a DVMA write bus cycle to be created at the system bus interface. This DVMA cycle, in turn, causes the CPU data, which is clocked into the standard system bus interface data registers, to be written either into the I/O subsystem buffers or into the cache memory subsystem. Within the preferred embodiment, the conclusion of the loopback write cycle is signaled to the CPU upon the initiation of the DVMA write bus cycle. Within other implementations, the completion of the loopback write cycle may be delayed until the conclusion of the DVMA write bus cycle.

Similarly, within the preferred embodiment, a loopback read bus cycle from the CPU causes a DVMA read bus cycle to be created at the system bus interface. This DVMA cycle, in turn, reads data from either the I/O subsystem buffers or from the cache memory subsystem, which is captured at the system bus interface registers. These interface register contents may be read back into the CPU through a subsequent loopback read bus cycle to complete the diagnostic check.

In other implementations of the loopback controls, a second loopback read cycle to read the system bus interface registers may not be needed. With this approach, the loopback read cycle to the system bus interface would generate an internal DVMA cycle which returns data to the system bus interface registers, where it is in turn sent back to the CPU to complete the loopback read cycle.

The term "loopback controls" as used below will be meant to include all associated controls, data paths, and diagnostic and programming support necessary to make the standard system bus loopback testing mechanism functional.

Standard System Bus Addressing Requirements

Within loopback controls, the loopback testing with DVMA disabled has no address requirements beyond those imposed on the system for the execution of normal standard system bus master cycles. With DVMA enabled, the implementation of the loopback controls requires that the CPU, in combination with the loopback controls, be capable of generating standard system bus master addresses which may, in turn, be captured at the standard system bus interface and then be interpreted as DVMA addresses directed into the system's DVMA address space.

Within the preferred embodiment, the standard system bus is the VMEbus interface. Using the nomenclature of the VMEbus specification, this interface supports a master interface with A32D32, A24D32, A24D16, A16D32, and A16D16 address/data sizing options. (These modes are specified for each VMEbus cycle by the setting of Address Modifier bits on the VMEbus address interface.) The system's slave interface supports A32D32, A24D32 and A24D16 address-/data options. Within both the 24 and 32 bit VMEbus address spaces, the lowest 1 MB is recognized by the system's VMEbus slave interface as a DVMA address directed to the system's memory, provided that DVMA is enabled.

Using an example from the preferred embodiment, assume that a VMEbus master cycle is initiated, while loopback and DVMA are enabled, into the lowest 1 MB of the VMEbus address space. Then, while using one of the addressing modes supported by the VMEbus slave interface, this bus cycle may be interpreted at the VMEbus slave interface as a DVMA cycle directed into the system's slave interface. This addressing would satisfy the requirement set forth above that the master interface be capable of generating addresses interpreted as being in the system's DVMA address space for the standard system bus.

Loopback Control Hardware Requirements

Basic hardware requirements are set forth in this section. First, if the loopback controls are to test a standard system bus interface with DVMA disabled, then the functional testing would consist of writing data to the system bus interface and then subsequently reading this data back for comparison. Therefore, the loopback controls under this mode of operation would require that the system bus interface be capable of clocking and holding data written by the CPU on its master write bus cycle. This data would remain held until it is subsequently read by the CPU during a master read cycle.

A second requirement comes about in those systems having common data paths shared by both master cycles and slave cycles to the standard system bus interface. Depending on the requirements of the standard system bus, this common useage of data paths and controls can lead to deadlock. For example, an attempt by the CPU to initiate a master cycle to the standard system bus could deadlock if the system bus is in use with a DVMA cycle directed to the system's memory.

For this reason, a typical workstation or server will have, as a part of its controls, logic to both detect and break deadlocks resulting from conflicts over shared system components. In those implementations of loopback controls which wait until the conclusion of the generated DVMA bus cycle before completing the loopback bus cycle from the CPU, loopback controls depend on both the detection and control of deadlocks resulting from conflicts over access to the standard system bus interface.

As an extension of these deadlock controls, depending on the implementation, loopback controls may also require a mechanism to capture the address for the master cycle at the standard system bus address interface. Depending on the system design, deadlock may require that this address be held as the address source during the loopback DVMA bus cycle completion.

BRIEF DESCRIPTION OF THE DRAWINGS

FIG. 2b is a block diagram of major functional elements of the I/O Cache of FIG. 2a.

DETAILED DESCRIPTION OF THE INVENTION

Figure 1A:
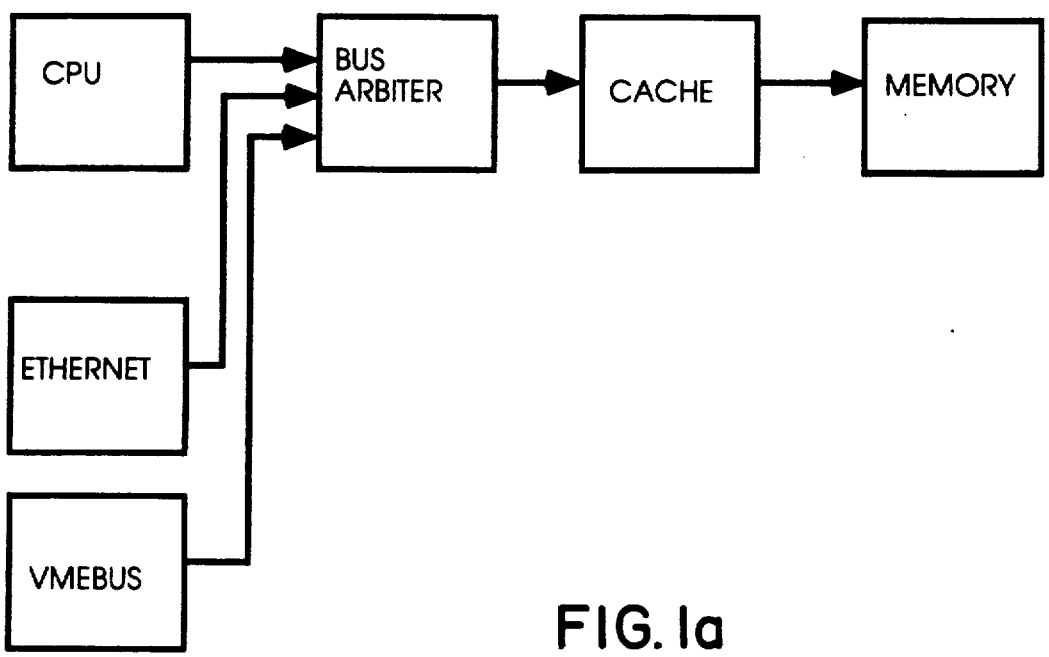
FIGS. 1a and 1b are block diagrams of two alternate system configurations supporting DVMA, both of which can incorporate the present invention, the first configuration supporting DVMA through a central cache and the second supporting DVMA through an independent I/O subsystem.
Figure 1B:
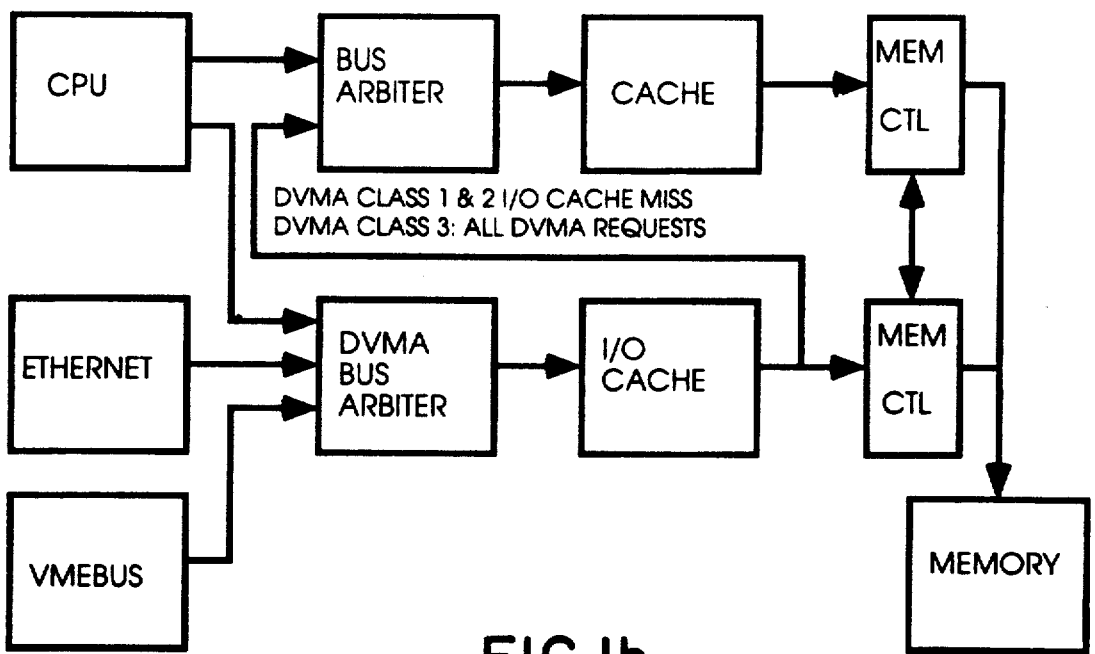
Figure 2A:
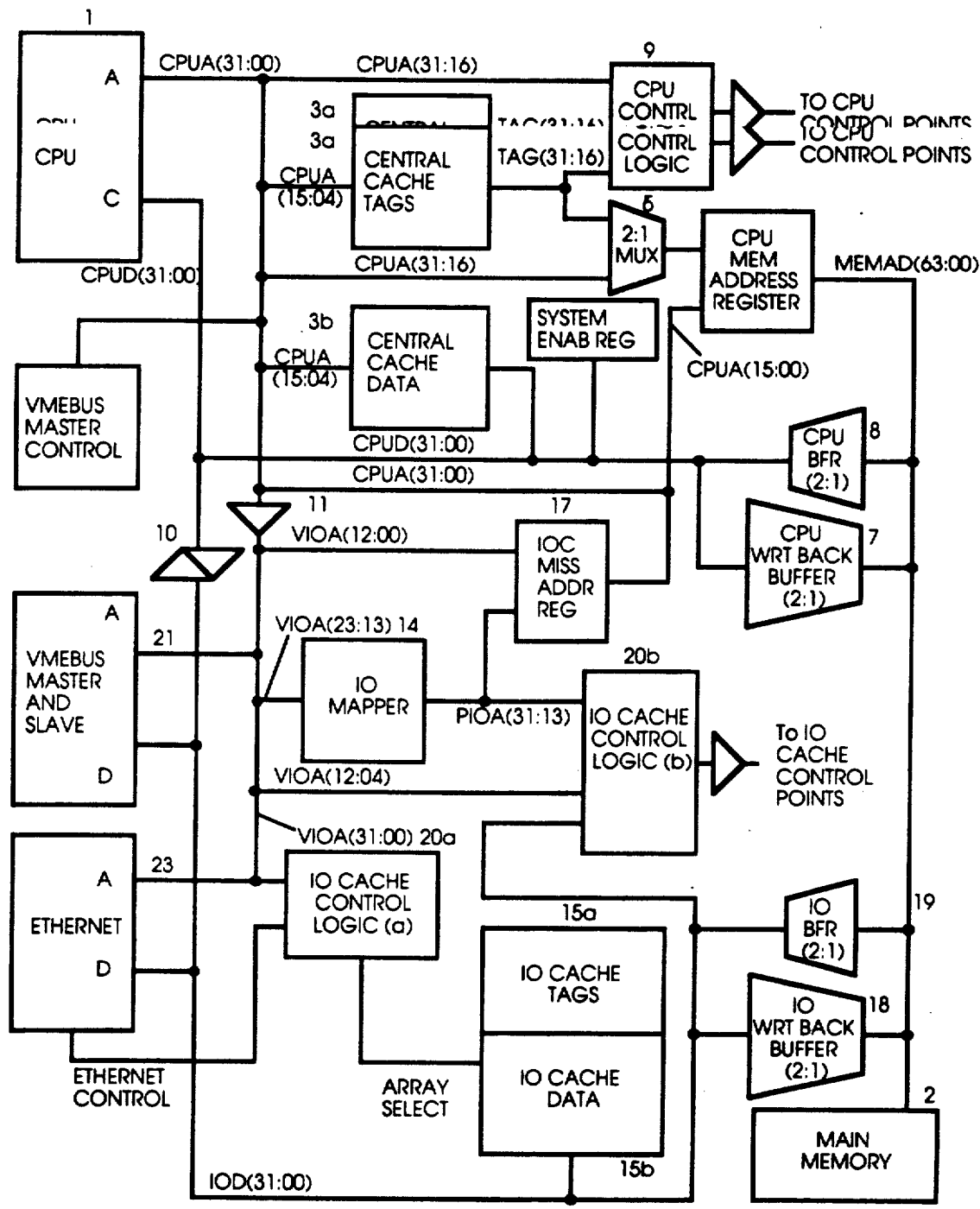
FIG. 2a is a block diagram of the major functional elements in a workstation or server which incorporates loopback controls. This system also incorporates an I/O Cache as a part of its I/O subsystem.

FIG. 2a shows in more detail the functional blocks in a workstation or server in which the present invention is implemented. The CPU and memory subsystem includes a microprocessor or Central Processing Unit (CPU) with its address buffer and data transceiver, CPU Address and Data busses, the System Enable Register, the Central Cache Tag and Data Arrays, an Address Incrementer, a CPU Memory Address Multiplexer, a CPU Memory Address Register, CPU Control Logic, a CPU Input Data Buffer (labeled CPU Bfr), a CPU Write Back Buffer (labeled CPU Wrt Back Buffer), a CPU to DVMA Data Transceiver, VMEbus Master Controls, a CPU to DVMA Address Buffer, a Memory Bus, and Main Memory. The I/O subsystem includes a VMEbus Master and Slave interface with its address buffer and data transceiver, an Ethernet Network DVMA interface with its address buffer and data transceiver, a DVMA Address and Data bus, an I/O Mapper, an I/O Cache Miss Address Register, I/O Cache Control Logic to both address and control the I/O Cache and to control other DVMA logic, the I/O Cache Tag and Data Arrays, an I/O Cache Input Data Buffer (labeled IO Bfr), and an I/O Cache Write Back Buffer (labeled IO Wrt Back Buffer). A number of components of the CPU and memory subsystem also play a role in DVMA operations.

Figure 2B:
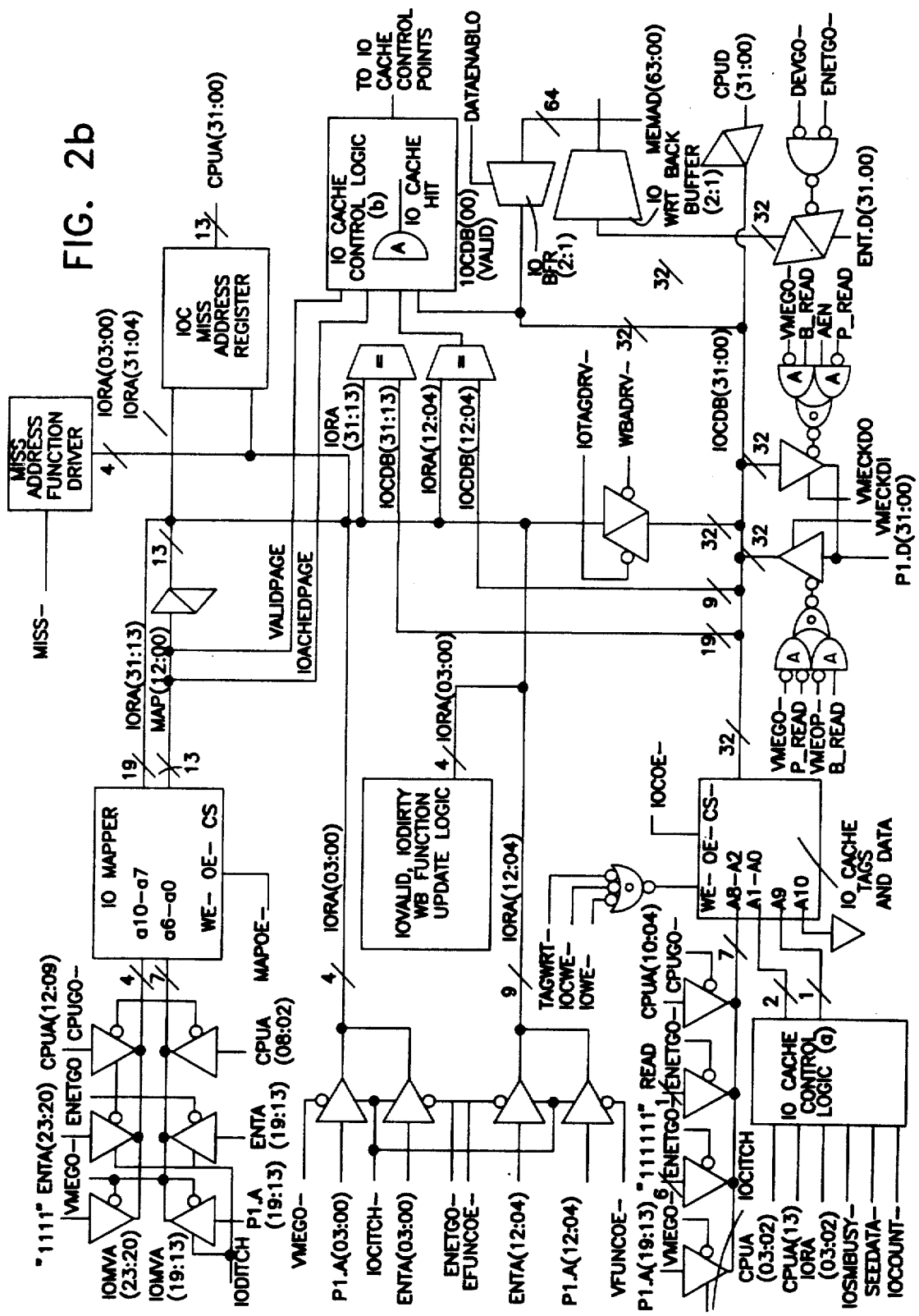

FIG. 2b shows the I/O Cache subsystem in more detail. There are four added functional blocks shown in this diagram: the upper address comparator (for A3-

1-A13); the lower address comparator (for A12-A04); the Miss Address Function Driver; and the IOvalid, IOdirty, Write Back Function Update Logic. In addition, the useage of control signals set by the state machine flow charts (in later figures) is also shown.

In the above description, the I/O subsystem is characterized as having DVMA devices. This description may be modified to include Direct Memory Access (DMA) devices either as a substitute for DVMA devices or in conjunction with DVMA devices. DMA devices differ, conceptually, from DVMA devices only in their mechanisms to address data in main memory. DMA devices access memory using real (or physical) memory addresses; DVMA devices access memory through virtual memory addresses which are mapped to real addresses. The mechanism to accomplish this mapping in the present example system is the I/O Mapper. The concepts of system bus loopback, developed here for a system with DVMA devices, may be extended as well to a system supporting DMA devices.

Description of the Elements of a System with System Bus Loopback: the CPU Cache Subsystem The CPU issues bus cycles to address instructions and data in memory and possibly other system devices, specifically including the System Enable Register and the VMEbus system bus master interface. The CPU address itself is a real address of (A) bits in size which uniquely identifies bytes of instructions or data. The CPU bus cycle may be characterized by one or more control fields to uniquely identify the bus cycle. In particular, a Read/Write indicator is required, as well as a "Type" field. This field identifies the memory address and data space as well as the access priority (i.e., "Supervisor" or "User" access priority) for the bus cycle. A CPU which may be utilized in a workstation or server having real addressing and capable of supporting a multi-user operating system is a Motorola MC68030. Note that the Motorola MC68030 has an integral Memory Management Unit, and consequently presents real (or physical) addresses to the CPU Address Bus.

The CPU is interconnected with other system devices and local device busses through the CPU Address and Data busses. The Address bus is a real address bus 32 bits in width. The CPU Data bus is also 32 bits in width.

Connected to the CPU Data bus, possibly through buffers, is a System Enable Register. This register contains control bits for the system operation. Specific bits needed for the present invention are a "Loopback Enabled" bit and a "DVMA Enabled" bit. These bits may be read and written by the CPU through bus cycles to unique addresses decoded by the CPU Logic. The register output bits control state transitions for various state machines within both the CPU Control Logic and the I/O Cache Control Logic A cache subsystem is an optional element of the CPU subsystem for the workstation or server in which the present invention may be implemented. Within the preferred embodiment, the cache subsystem has meaning insofar as the present invention is concerned only in that DVMA data may reside in this cache. If this is the case, then loopback bus cycles with DVMA enabled may need the central cache and its controls to either source data to the system bus interface or to provide data consistency for the I/O subsystem.

Within the Central Cache, the Central Cache Data Array is organized as an array of $2^N$ of data, each of which contains $2^M$ bytes. The $2^M$ bytes within each block are uniquely identified with the low order M address bits. Each of the $2^N$ blocks is uniquely addressed as an array element by the next lowest N address bits.

The Central Cache Data Array described herein is a "direct mapped" cache, or "one way set associative" cache. While this cache organization is used to illustrate the invention, it is not meant to restrict the scope of the invention, which may also be used in connection with multiway set associative caches.

Another element required for the Central Cache operation is the Central Cache Tag Array, which has one tag array element for each block of data in the Central Cache Data Array. The tag array thus contains $2^N$ elements, each of which has a Valid bit (V), a Modified bit (M), and a real address field (RA). The contents of the real address field, together with low order address bits used to address the cache tag and data arrays, uniquely identify the cache block within the total real address space of (A) bits. That is, the tag real address field must contain at least $(A-(M+N))$ bits.

Central Cache "hit" logic within the CPU Control Logic compares the real addresses for cache accesses to the contents of the Central Cache Tag address field. Within the access address, the lowest order M bits address bytes within a block; the next lowest N bits address a block within the cache; and the remaining $(A-(M+N))$ bits compare with the tag real address field, as part of the cache "hit" logic. Protection checking for the real address cache is not necessary, since this can be accomplished at the time of address translation from virtual to real addresses, which is done within the I/O Mapper for DVMA cycles.

The system described here utilizes a real address Central Cache. The use of a real address cache is not a requirement for the implementation of the present invention: a virtual address Central Cache, with the appropriate controls for protection checking and the detection of "alias" virtual addresses within the cache control logic, is another possible system configuration in which the present invention may be implemented. ("Alias" virtual addresses arise when two or more different virtual addresses map to the same real address.)

The Address Incrementer controls the word addressing for data within the Central Cache Data Array. In the preferred embodiment, cache blocks are 16 bytes, or 4 words, in length. The Address Incrementer controls the address generation of bits A(03:02) for the data array.

The CPU Memory Address Multiplexer multiplexes the high order address bits TAGA(31:16) from the Central Cache with the corresponding address bits CPUA(31:16) from the CPU Address Bus. The TAGA bus typically specifies a portion of a write back address, while CPUA(31:16) specifies a portion of a cache miss address. The multiplexer sends the resulting address into the CPU Memory Address Register. This register receives its low order address bits from the CPU Address Bus, bits CPUA(15:00).

The CPU Memory Address Register serves as the address interface to the Memory Bus for all accesses to main memory. These accesses specifically include reading cache blocks, writing back modified cache blocks, and writing partially modified double words (selected bytes from 8 byte double words).

The CPU Control Logic uses the results of the Central Cache hit/miss indication, as well as other information from the CPU and other system devices to control the operation of that portion of the system related to the CPU. A specific instance of a CPU operation controlled by the CPU Control Logic are VMRbus Master bus cycles.

The CPU Input Data Buffer is a registered buffer for 64 bits of data from the Memory Bus. This register has no direct useage for loopback operation in the present implementation but is listed for completeness. It multiplexes the data onto the CPU Data Bus in 32 byte increments. On cache miss operations, the word miss address bit A(2) specifies which word from the CPU Input Data Buffer is multiplexed onto the CPU Data Bus first.

The CPU Write Back Buffer is a buffering register for a full cache block which is loaded from the 32 bit CPU Data Bus and drives the 64 bit Memory Bus. This register has no direct useage for loopback operation in the present implementation but is listed for completeness. It is used to buffer modified cache blocks as well as partially modified double words to be written to memory.

The CPU to DVMA Data Transceiver buffers data between the CPU Data Bus and the DVMA Data Bus. As long as DVMA devices "hit" the I/O Cache, these two busses and their controlling logic normally operate independently (that is, the buffers are disabled).

The CPU to DVMA Address Buffer registers and buffers the address from the CPU when it accesses devices which are on the DVMA Data Bus. These devices include the VMEbus master interface and the I/O Cache Tags and Data, for both diagnostic operations and cache flushing.

Figure 13:
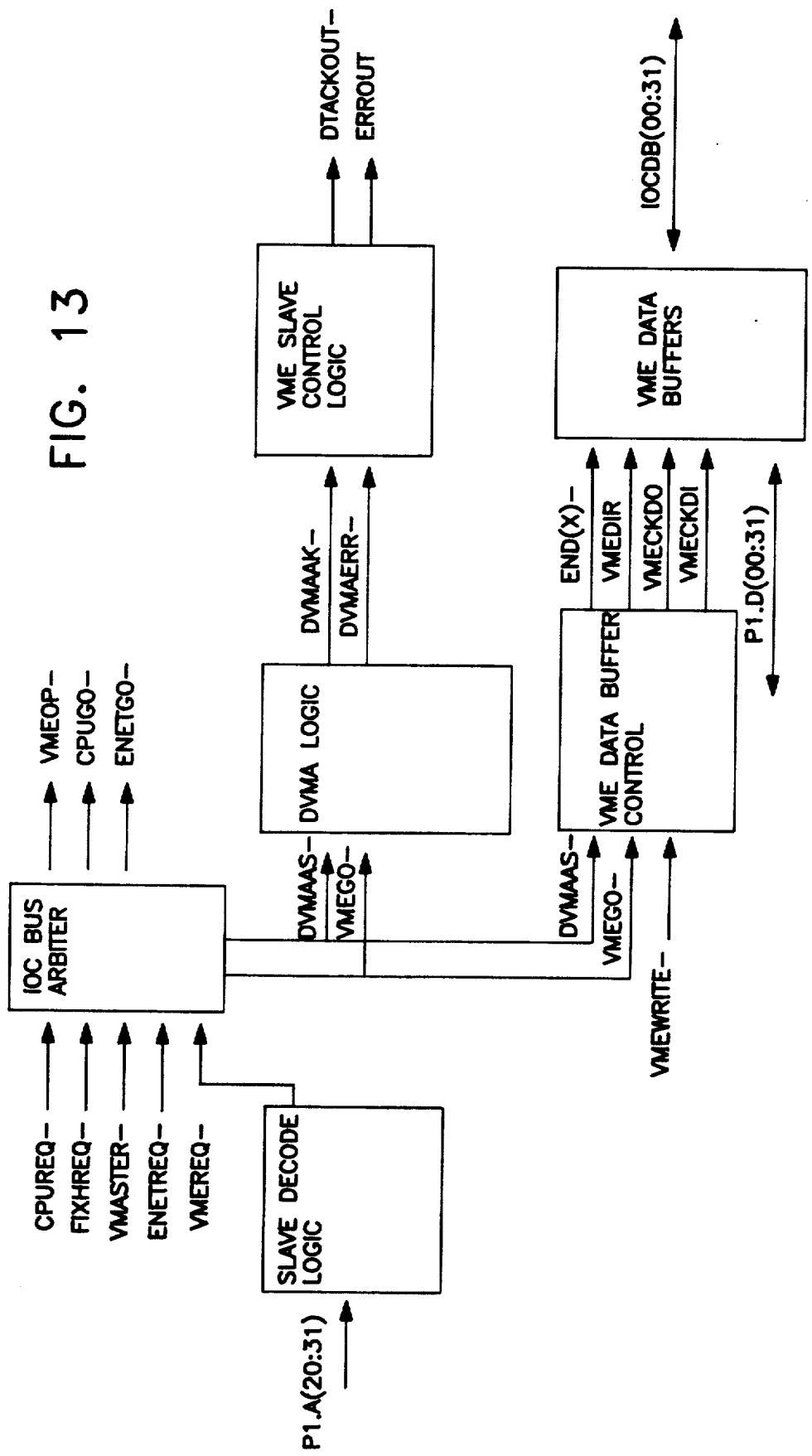
FIG. 13 is a block diagram of the VME slave port interface.
Figure 14:
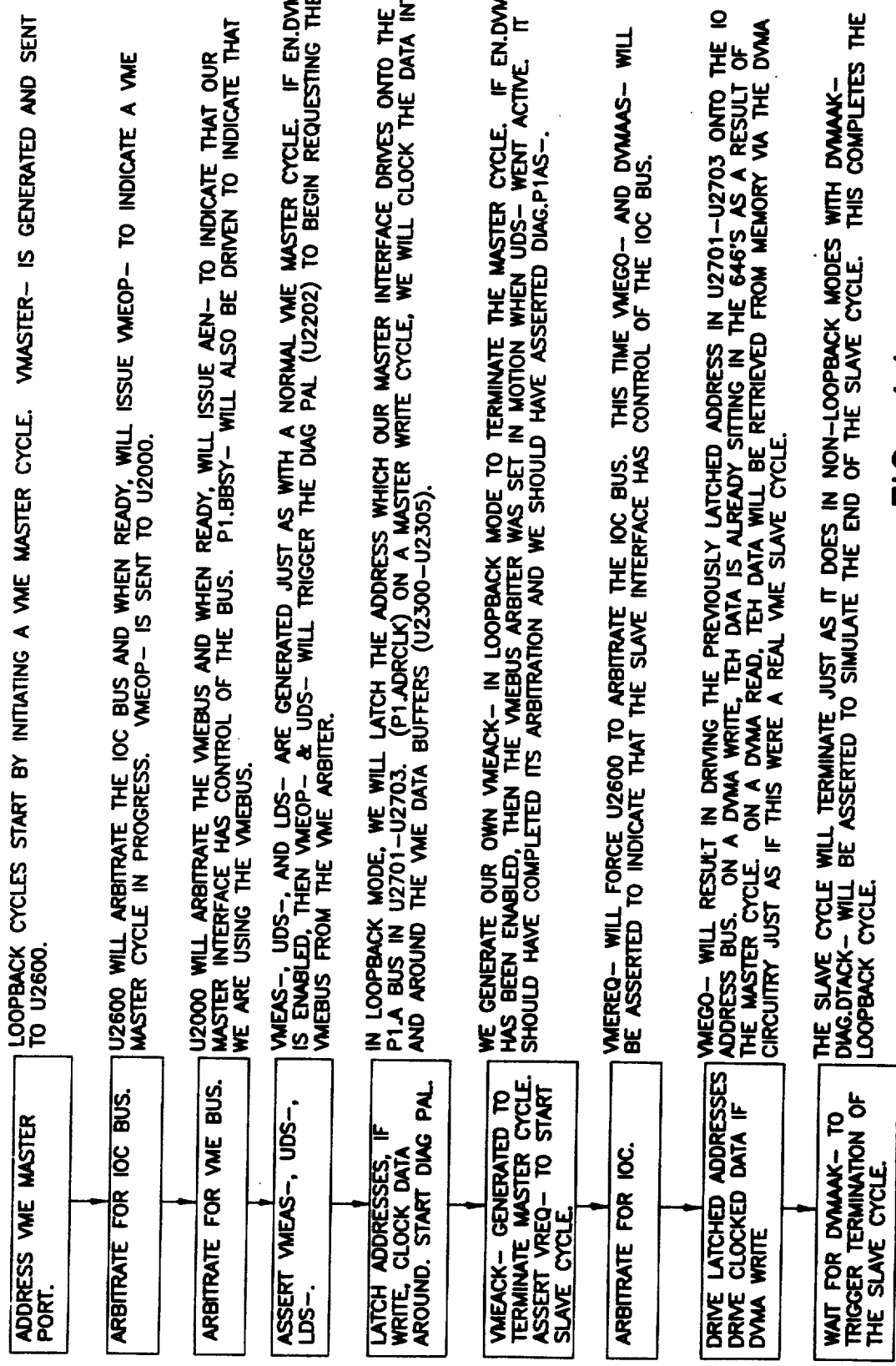
FIG. 14 is a diagram outlining the VME loopback operation.
Figure 2A:
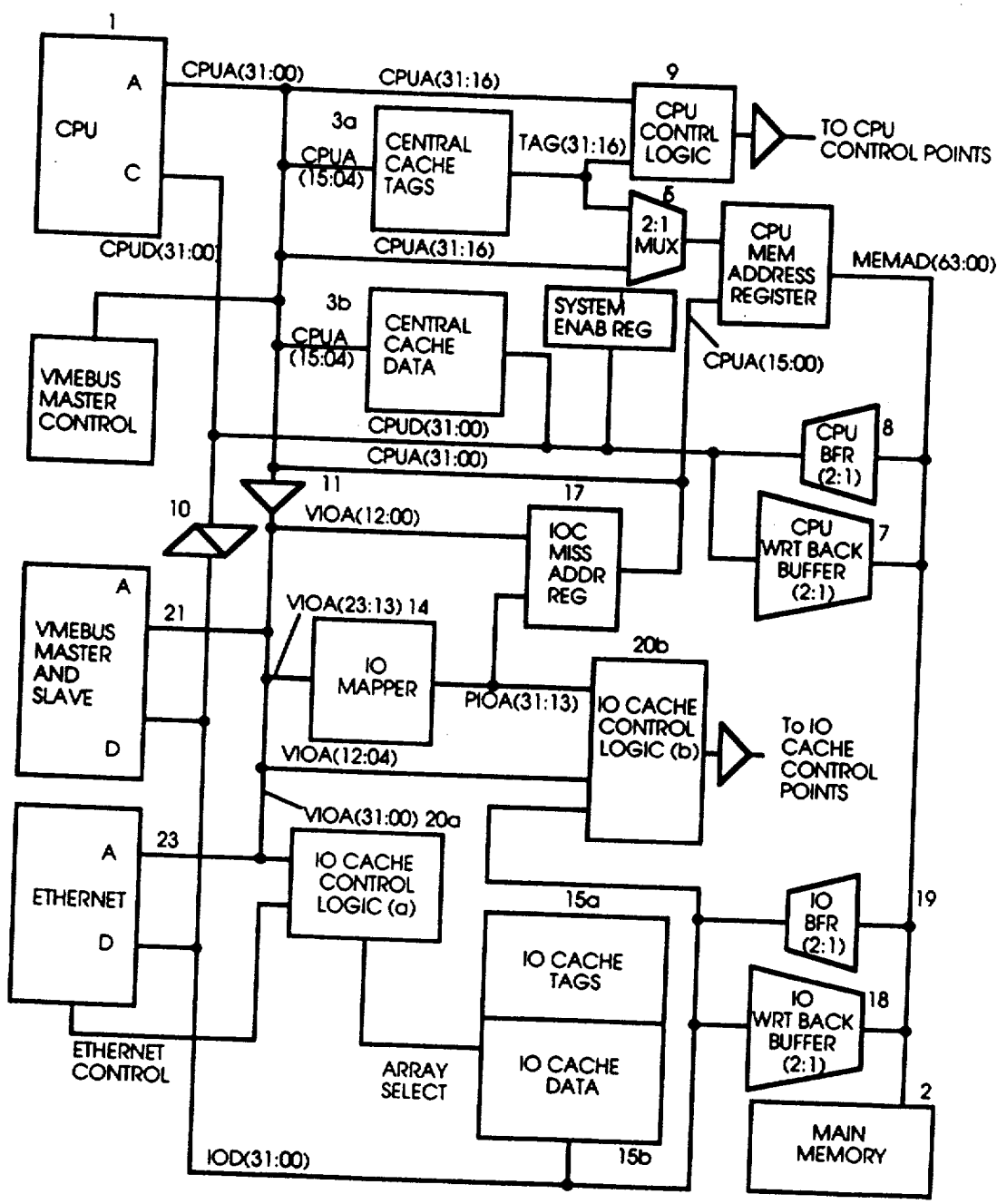

The Memory Bus is a 64 bit multiplexed Address and Data bus, whose operation is described in FIG. 13. The CPU Memory Address Register is the source for the memory address for both CPU and DVMA bus cycles, but the data buffers for CPU and DVMA operations are independent. That is, data transfers for DVMA operations utilize the IOC Input Data Buffer and IOC Write Back Buffer, while CPU transfers use the CPU Input Data Buffer and the CPU Write Back Buffer.

Main Memory is accessed over the 64 bit Memory Bus. It is addressed as a 30 bit device, is implemented with Dynamic RAM parts, and includes registers and controls for such operations as initializing physical address ranges, checking and generating ECC codes, generating DRAM Refresh, and reporting errors. These memory features and others are only necessary to the invention as they enable the implementation of a reliable main memory subsystem. Both the Memory Bus and Main Memory are used in loopback controls in that they supply the normally used data path for DVMA cycles.

Description of the Elements of a System with System Bus Loopback: the CPU Cache Subsystem Operation supporting Loopback Within the CPU, Central Cache, and Memory subsystem, system bus loopback depends on the CPU Control Logic to decode and control VMEbus master cycles. Within the present implementation, the cache and memory subsystem are utilized for loopback operation in two possible roles. First, if DVMA is enabled and the DVMA page is marked I/O cacheable, the Central Cache and memory subsystem provide data consistency between the Central Cache and the I/O Cache. Second, if DVMA is enabled and the DVMA page is marked non-I/O cacheable, the Central Cache and memory subsystem can be the source (or destination) of the DVMA data at the system bus interface on loopback bus cycles.

For this latter case, the I/O Cache Miss Address Register (described below) issues a physical address, translated through the I/O Mapper from the loopback address. This address is checked against the contents of the Central Cache Tag Array. The low order bits of the address from the I/O Cache Miss Address Register are used to address both the Central Cache Tag and Data arrays. In particular, bits A(15:04) address the Tag Array, and bits A(15:02) address a word in the Data Array. The high order bits A(31:16) of the I/O Cache Miss Address Register address are compared with the contents of the address field of the Tag Array with the Central Cache Tag Address Comparator. If the compare is a match and the tag entry is legitimate, as indicated by a "Valid" bit within the Tag Array entry, then the I/O Cache Miss Address Register access has resulted in a Central Cache "hit". If the I/O Cache Miss Address Register issued a read operation, the contents of the Central Cache Data Array addressed by A(15:02) are sent to the DVMA Data bus. If the I/O Cache Miss Address Register issued a write operation, data from the DVMA Data bus is written into the Central Cache Data Array entry addressed by A(15:02), with bytes modified as indicated by a "size" field set by the I/O Cache Miss Address Register. The corresponding Tag entry's "Dirty" bit is set to indicate that the cache line has been modified.

Should the address issued by the I/O Cache Miss Address Register not result in a Central Cache "hit" (i.e., result in a cache "miss"), and the DVMA page is marked cacheable for the Central Cache, a block of data from Main Memory is read through the CPU Input Data Buffer and placed into the Central Cache Data Array. On a DVMA read miss, the miss data from the memory interface is forwarded onto the DVMA Data bus. If the operation is a write, incoming data from Main Memory is merged with modified bytes of DVMA data from the DVMA Data bus. This merged data is written into the cache, along with the rest of the cache block from memory, and the "Dirty" bit in the Central Cache Tag Array is set. For any miss, as long as the DVMA page is marked cacheable for the Central Cache, the address of the new data is written into the address field of the Central Cache Tags.

Should a cache miss require data from Main Memory to be written to a location in the Central Cache Data Array currently occupied by a valid cache block that had been previously modified, the block is first read out of the Central Cache Data Array into the CPU Write Back Buffer. The data is written into Main Memory from the CPU Write Back Buffer after the memory read required by the cache miss. If the Central Cache hit rate is high, then the Main Memory traffic generated by the CPU will be low, allowing high bandwidth for DVMA devices to access Main Memory.

For the case where DVMA is enabled and the DVMA page is marked I/O cacheable, the Central Cache may be used to provide data consistency between the Central Cache and the I/O Cache. In one possible implementation, if the I/O Cache Miss Address Register indicates a read DVMA bus cycle, then data is sourced from the Central Cache onto the DVMA Data bus if the DVMA address "hits" the Central Cache. If the DVMA read address "misses" the Central Cache (the typical case) then read data is sourced from Main Memory through DVMA subsystem data buffers, as explained below.

Similarly, if the I/O Cache Miss Address Register indicates a write DVMA bus cycle on a data consistency check, then a "hit" in the Central Cache causes the Central Cache entry at the "hit" address to be invalidated.

Description of the Elements of a System with System Bus Loopback: the I/O Subsystem Within the I/O subsystem, the VMEbus Master and Slave Interface includes drivers and receivers for the VMEbus address and data busses together with arbiter logic, interrupt handling logic, and such other controls as are needed to implement a VMEbus Master and Slave interface according to the VMEbus specification. The VMEbus Slave interface supports DVMA cycles from the system bus.

Figure 3A:
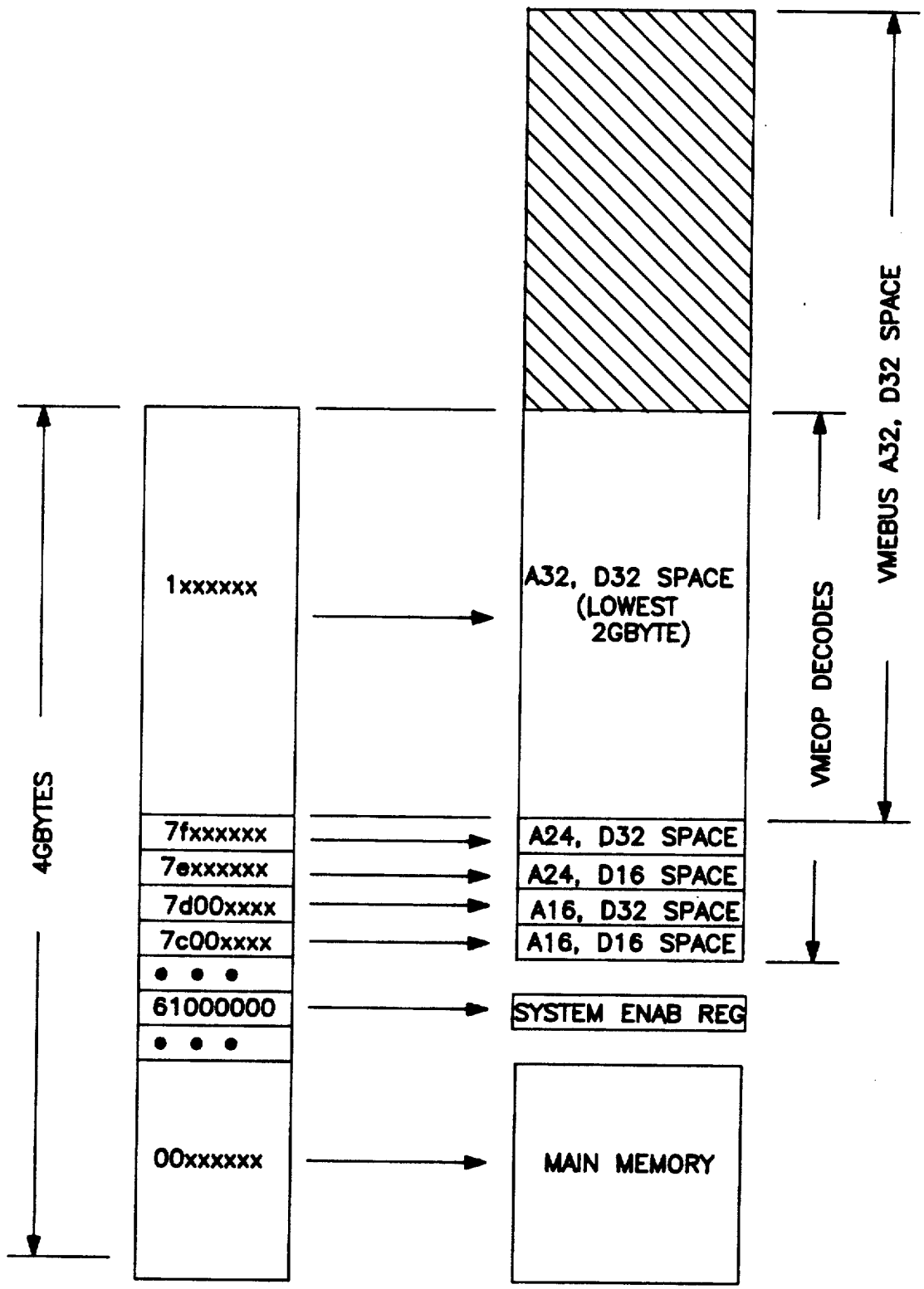
FIG. 3a is a diagram showing the CPU address space for a workstation or server.
Figure 3B:
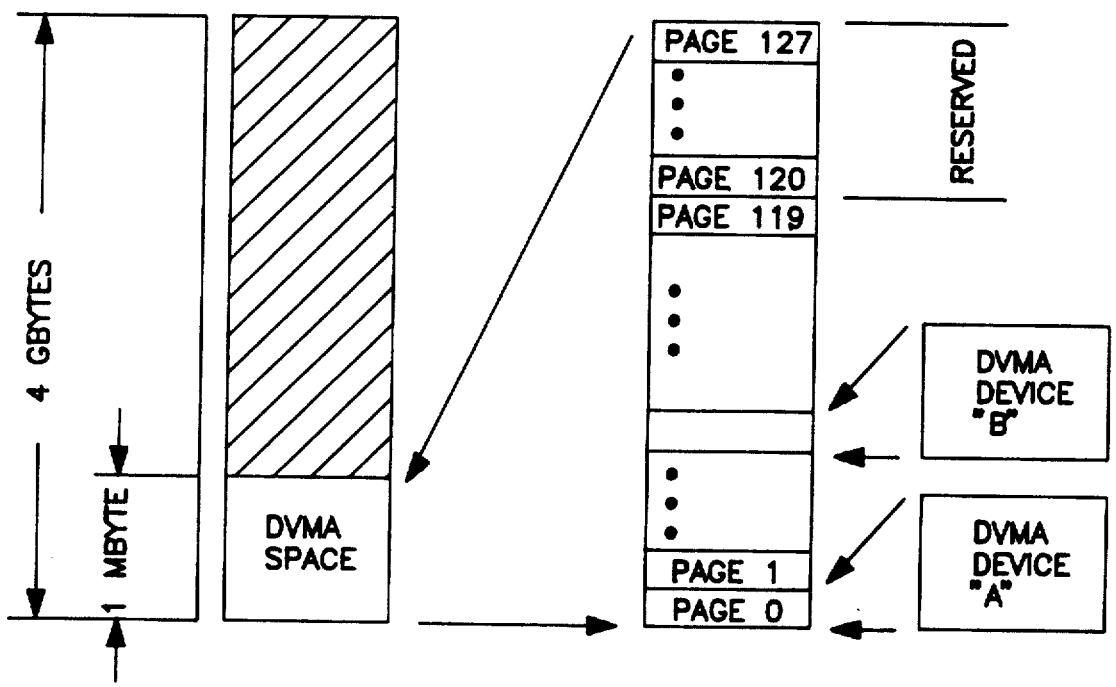
FIG. 3b is a diagram showing the VMEbus DVMA address assignment for a workstation or server.

A particular element of this control is logic to recognize virtual VMEbus addresses within the CPU's DVMA address space. This DVMA virtual address space is shown in FIG. 3b. From the full 32 bit (4 gigabyte) VMEbus address space (VMEbus A32 option from the VMEbus specification), or from the 24 bit (16 Megabyte) VMEbus address space (option A24 from the VMEbus specification), the lowest (P) pages are recognized as the DVMA virtual address space for the system, where each page is of size (S) bytes. In the present implementation, the page size is (S=8) kilobytes, and the DVMA virtual address space for VMEbus devices is (P=128) pages total. Of these, the top 8 pages are reserved.

With loopback and DVMA enabled, the VMEbus slave interface, together with the loopback controls, must recognize any loopback cycle from the CPU which is addressed to the VMEbus DVMA address space, corresponding to A(31:20)=0×000 (A32 option) or A(23:20)=0×0 (A24 option). Such a cycle will cause a VMEbus DVMA cycle to be created at the same VMEBus virtual address.

The Ethernet Network DVMA Interface includes an Ethernet control chip and supporting logic together with address and data registers and buffers to interconnect with the DVMA Address and Data busses.

The DVMA Address Bus is a virtual address address bus which interconnects the VMEbus DVMA address interface, the Ethernet DVMA address interface, and the CPU to DVMA Address Buffer with the I/O Mapper, the block address inputs for the I/O Cache Tag and Data Arrays, the I/O Cache Address Comparator, the I/O Cache Miss Address Register, the I/O Cache Address to Data Buffer, and the I/O Cache Control Logic.

The DVMA Data Bus interconnects the VMEbus data interface, the Ethernet data interface, and the CPU to DVMA Data Transceiver with the I/O Cache Tag and Data Arrays, the I/O Cache Address to Data Buffer, the I/O Cache Address Comparator, the I/O Cache Input Data Buffer, the I/O Cache Write Back Buffer, and the I/O Cache Control Logic.

The I/O Mapper translates the virtual addresses from the DVMA devices into physical addresses while performing protection checking. The Mapper is effectively a simple MMU. It has an entry for each page of the DVMA address space. Each entry is L bits in width and is broken into an address bit field and a status bit field. The address field provides the translation from virtual to physical page number for the virtual address supplied at the input. The status field consists of several bits which indicate, if the page is valid, what the write and access protections for the page are, and if the page is I/O Cacheable. The key status bit required is the I/O Cacheable bit. The particular content of the I/O Mapper may vary considerably. In fact, an I/O system using DMA, with physically mapped devices, can still use the same principles described in this invention. An I/O Cacheable bit would, however, still be required for such a system.

The I/O Cacheable bit in the I/O Mapper distinguishes those pages, and consequently those DVMA devices, which can use the I/O Cache from those which can not. DVMA transfers for these later devices are handled as accesses to the Central Cache, ignoring the I/O Cache.

The Miss Address Function Driver drives the low order address bits, IORA(03:00), with new updated page statistics and control bits during a page mapper update.

The I/O Miss Address Register captures the physical DVMA address for both those DVMA cycles which "miss" the I/O Cache and those cycle which are non-I/O Cacheable, as indicated in the I/O Mapper. The address source for low order bits within a page is the Virtual I/O Address Bus, while the I/O Mapper sources the physical page translation.

The I/O Cache Control Logic controls the arbitration of the CPU and DVMA devices for use of the I/O Address and Data busses; the indexing of both the I/O Mapper and the I/O Cache Tag and Data Arrays; the updates of the I/O Mapper from the CPU; updates of the I/O Cache Tag and Data Arrays from the CPU, from the I/O Mapper, and from Main Memory; and all other controls associated with independent DVMA operation of the I/O Cache. This logic also interacts with the CPU Control Logic on all I/O Cache misses, all CPU accesses to devices within the DVMA subsection, in particular the VMEbus master interface, and on all DVMA accesses to non-I/O Cacheable pages. It finally provides such control related to the handling of DVMA cycles and CPU access of DVMA logic which is necessary for both testability and functionality but is not explicitly enumerated in this summary description.

The I/O Cache Tag and Data Arrays contain P cache tag entries and P cache data blocks. Each I/O Cache data block contains B bytes of data. Generally, the I/O Cache Data Array block size is the same as the Central Cache block size. Each of the P I/O Cache Tag Array entries records the memory address and control information for each of the P blocks of data in the I/O Cache Data Array at the corresponding address.

In the preferred embodiment, the I/O Cache Tag and Data Arrays are addressed with VIOA(19:13) for VMEbus DVMA devices, which corresponds to the page index within the VMEbus DVMA address space. Within this range, the top 8 pages are unused. Two of these are in turn assigned for use as Ethernet buffers: one for Ethernet read data, at A(19:13) =0×7f, and one for Ethernet write data, at A(19:13)=0×77.

The address field of the I/O Cache Tag Array contains a physical address. The I/O Mapper maps both the 24 bit Ethernet DVMA address space and the 20 bit VMEbus address space into the physical address space, which is 32 bits in this implementation. With a 16 byte block size, the address field in the I/O Cache Tag Array in this implementation contains the physical address A(31:04).

In an I/O Cache Tag Array access, the Tag Array address field bits A(31:13) are compared with the physical address PIOA(31:13) from the I/O Mapper, while the bits A(12:04) from the address field, which identify the block within a page, are compared with the corresponding bits VIOA(12:04) in the VIOA bus. If the two comparisons described above match and the valid bit of the I/O Cache Tag Array entry is set, then an I/O Cache "hit" is indicated.

Besides CPU accesses to the I/O Cache for diagnosis and flushing (data consistency), the I/O Cache Tag Array is also updated as a part of normal DVMA cycles. If the DVMA device access "hits" the I/O Cache, then no update of the Tag Array is required. If the DVMA device bus cycle is I/O Cacheable, has no protection violation (as indicated through the I/O Mapper) and "misses" the I/O Cache, then at the conclusion of the DVMA bus cycle, the entry in the Tag Array will be written with the new DVMA physical block address, the valid bit set to true, and the modified bit set if the DVMA device is executing a write cycle. On DVMA write cycles which "miss" the I/O Cache, if the old Tag Array entry is marked valid and modified, then the physical block address from the Tag Array, A(31:04) in the present implementation, is written into the I/O Cache Miss Address Register. This address will be loaded into the CPU Memory Address Register to provide the write back address for modified I/O Cache block.

The I/O Cache Data Array has P blocks, corresponding to the P Tag Array entries. During DVMA cycles which "hit" the I/O Cache, data from the I/O Cache Data Array is read from or written to the array. In the present implementation, the address VIOA(19:13) selects a block and VIOA(3:2) selects a word within the block. On a DVMA read cycle generated by a loopback cycle, data is read from the array and returned to the system bus interface. On a DVMA write cycle generated by a loopback cycle data from the system bus interface is written into the array, using I/O Cache word and byte select logic to select the cache data to be updated.

During a DVMA read cycle which "misses" the I/O Cache, a block of data is written into the I/O Data Cache. In the present implementation, this data may originate from either of two sources: Main Memory, or the Central Cache. Which source is selected depends on a cache consistency check of the DVMA address against the Central Cache. If an address match is found, then a block of data from the Central Cache is downloaded to the DVMA Data Bus through the CPU to DVMA Data Transceiver. If no address match is found for the consistency check, then data is transferred from Main Memory.

During a DVMA write cycle which "misses" the I/O Cache, in the present implementation the I/O Cache Tag Array entry addressed by the DVMA device is first examined. If this block is valid and modified, then the block of data from the Data Array is downloaded into the I/O Cache Write Back Buffer; if the block is not modified, no download is necessary. The DVMA data from the current write cycle can now be written into the I/O Cache Data Array, while the I/O Cache Tag Array entry is updated with the new physical address and is marked valid and modified. A cache consistency check is made with the DVMA write address against the Central Cache; any matching entry is invalidated from the Central Cache. A DVMA write back cycle, with the address provided through the CPU Memory Address Register, returns the former modified data from the I/O Cache to Main Memory.

The I/O Cache Address Comparators provide the address comparison to determine if an I/O Cache "hit" has occurred. In the present implementation, the block identification bits from the Tag Array, A(12:04), must match the DVMA address in VIOA(12:04), and the physical page address from the Tag Array, A(31:13), must match the I/O Mapper physical address, PIOA(31:13).

The I/O Cache Address to Data Buffer provides the path to access the output of the I/O Mapper onto the I/O Data Bus. This buffer has two uses. First, this path is used to update the physical address field in the I/O Cache Tag Array. Second, the path is used for diagnostic testing of the I/O Mapper by the CPU.

The IOvalid, IOdirty, Write Back Function Update Logic drives the low order address bits, IORA(03:00), with new updated tag values on I/O Cache updates. It also examines these bits during an I/O cache tag check to see if a write back of a modified I/O Cache block is required.

The I/O Cache Input Data Buffer provides the data path to the I/O Cache data Array for DVMA data returned from Main Memory on DvMA read cycles which "miss" the I/O Cache. For DVMA read cycles generated by loopback, the "miss" DVMA data for the system bus interface is simultaneously bypassed to the system bus interface registers while it is written into the I/O Cache Data Array. The buffer is also used as the data path for returning data from Main Memory to those DVMA devices which are mapped to non-I/O Cacheable pages.

The I/O Cache Write Back Buffer provides the data path for writing modified data from the I/O Cache Data Array back into Main Memory. It is also the data path for writing data directly to memory for those DVMA devices which are mapped to non-I/O Cacheable pages.

Description of the Elements of a System with System Bus Loopback: the I/O Cache Subsystem Operation Summary Loopback testing requires the CPU to issue instructions to the VMEbus Master interface while the loopback mode is enabled. If DVMA is not enabled, then the transfer ends at the VMEbus interface. Any of the VMEbus address and data modes supported for the master interface may be tested. Loopback write cycles cause the CPU data to be captured in VMEbus interface data transceivers. A subsequent VMEbus loopback read cycle, with DVMA disabled, will cause the contents of the last data captured in these data transceivers to be read by the CPU.

If DVMA is enabled for the loopback cycle, the VMEbus Slave interface decodes the VMEbus address from the CPU to determine whether this address is a DVMA access to main memory. If so, a DVMA cycle is generated. In the preferred embodiment, the loopback cycle from the CPU is completed as the DVMA cycle is initiated. If the loopback cycle is a write cycle, the generated DVMA cycle will be a write cycle of the same data. If the loopback cycle is a read cycle, this bus cycle will complete by returning the data presently held by the system bus registers to the CPU, while generating a new DVMA read bus cycle. This DVMA bus cycle subsequently reads data from either the I/O Cache subsystem, the Central Cache, or Main Memory, depending on the state of the system, and returns this data to the system bus data registers, where is is captured by loopback controls. To complete the loopback test, a second loopback read cycle will read the contents of the system bus registers back to the CPU.

In another possible implementation, loopback cycles may complete only after the conclusion of the generated DVMA cycle. With this approach, a loopback write cycle would generate a DVMA write cycle, which would update the I/O Cache or main memory, depending on the system state. Concluding the DVMA write cycle would cause the loopback cycle from the CPU to complete.

A loopback read cycle would generate a DVMA read cycle. The VMEbus arbiter would force priority for the DVMA operation, causing the CPU to back off in order to break a deadlock over the I/O data paths. The DVMA read request resulting from the loopback cycle would complete its access to the I/O Cache, the Central Cache, or Main Memory, and then return the data to the VMEbus interface. There the CPU controls would take over and complete the VMEbus Master cycle with the data read through the DVMA operation.

The operation of the components of the I/O Cache subsystem for the DVMA transfer portion of the VMEbus loopback cycle is summarized below. The DVMA portion of the cycle begins with the VMEbus slave interface logic decoding the VMEbus address as being in the DVMA address space. The I/O cache tags and I/O Cache Mapper are accessed in parallel. The VMEbus address within the DVMA address space, VMEA(19:01), maps directly into the I/O address bus VIOA(19:01); VIOA(00) is set from VMEbus byte controls.

The virtual DVMA page address VIOA(19:13) indexes the I/O Cache Tag Array. The address field of the I/O Cache Tag Array contains a physical address. The I/O Cache Address Comparator compares the lower order block address bits contained in the address field of the tag entry selected, A(12:04), against the untranslated bits of the DVMA block address generated by the VMEbus device, in VIOA(12:04).

In parallel with the I/O Cache Tag Array access, the I/O Mapper is also accessed. The Mapper output, RIOA(31:13) is then compared with the Tag Array high order address field, TAGA(31:13) for the second tag address comparison. If the two comparisons described above match and the valid bit of the I/O Cache Tag Array entry is set, then an I/O Cache "hit" is indicated. If the loopback cycle is a read cycle, data from the I/O Cache Data Array entry is sent to the VMEbus interface. If the loopback cycle is a write cycle, data is driven from the CPU to the VMEbus interface data transceivers, where it is captured by loopback clocking controls in the system bus interface registers. From there it is driven onto the I/O Data Bus, and subsequently written into the I/O Cache Data Array entry. An I/O Cache "miss" results, in general, if either of the two address comparisons does not match, if the valid bit in the Tag Array is not set, or if the Dirty bit is not set on a bus cycle in which the DVMA device is doing a write cycle.

On a read "miss" cycle, the DVMA loopback cycle issues a read operation to a particular DVMA address which is not contained in the I/O Cache Tag Array. The I/O Cache Control Logic initiates a read operation to main memory after first checking the Central Cache, for cache consistency, to get a block of data at the address requested by the generated DVMA cycle. The subset of the block of data containing the byte or bytes requested is bypassed to the system bus interface register while the entire block is written into the I/O Cache Data Array.

On a write "miss" cycle, the DVMA loopback cycle issues a write operation to a particular DVMA address which is not contained in the I/O Cache Tag Array. The I/O Cache Control Logic arbitrates with the CPU and initiates a consistency check operation against the Central Cache. Before data from the system bus interface registers is written into the I/O Cache Data Array block, the current contents of the array are checked. If they are valid and modified, then they are downloaded into the I/O Cache Write Back Buffer. Then the I/O Cache Data Array is updated with the DVMA write data. The Write Back buffer contents are subsequently written into main memory.

On both read and write cycles which miss the I/O cache and have no protection violation, the I/O Cache Control Logic updates the I/O Cache Tag Array entry addressed by the DVMA device. The real address field bits A31:13) are updated with the translated physical address, from RIOA(31:13), transmitted onto the I/O Cache Data Bus through the I/O Cache Address to Data Buffer. The block address bits A(12:04) are updated from VIOA(12:04), similarly transmitted onto the I/O Cache Data Bus through the I/O Cache Address to Data Buffer.

Loopback Operation: VMEbus Master Cycles

Figure 5:
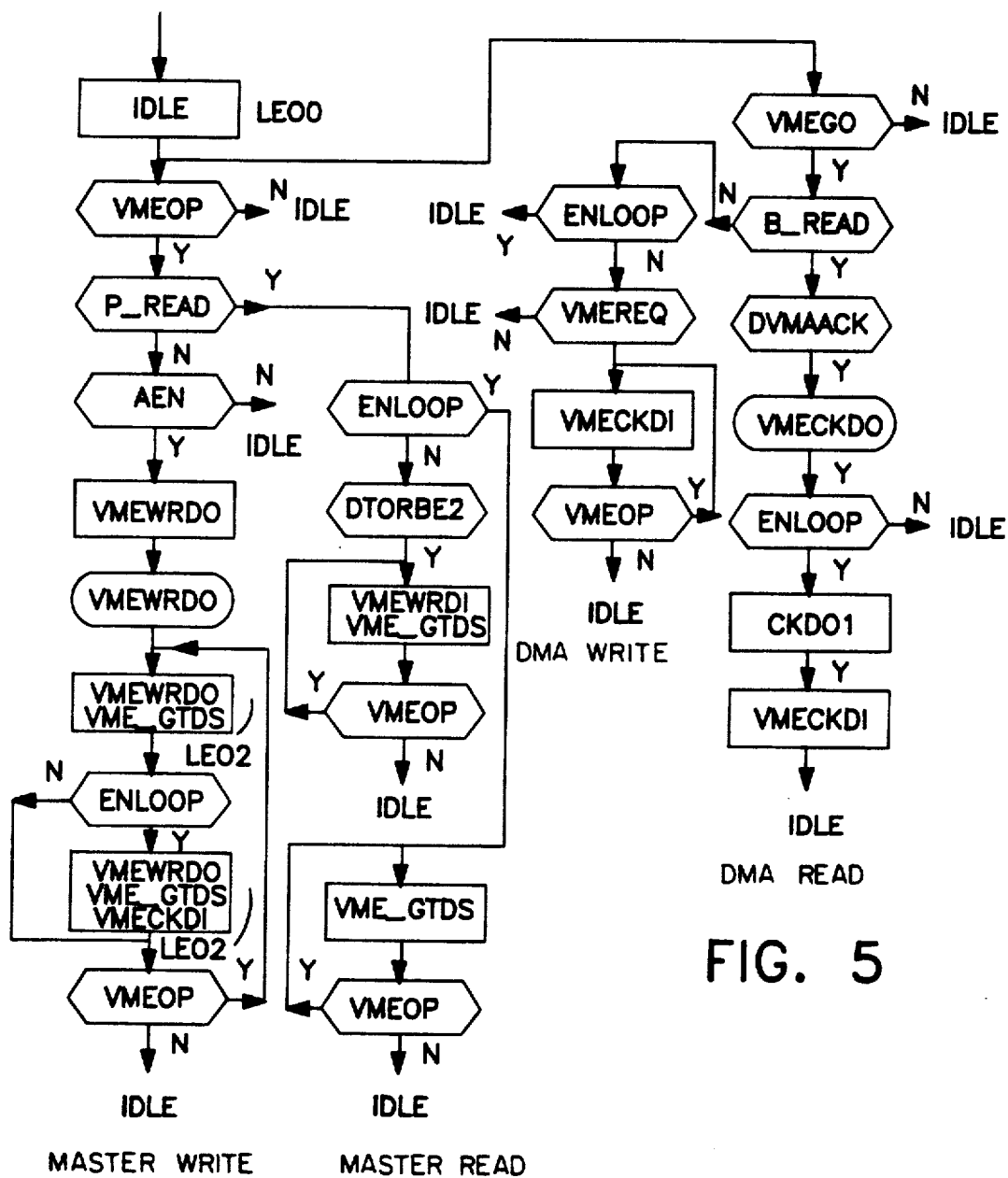
FIG. 5 describes the flow of the transceiver clocking at the VMEbus interface, as it is modified when loopback is enabled, which is indicated by the signal ENLOOP from the System Enable Register.
Figure 6:
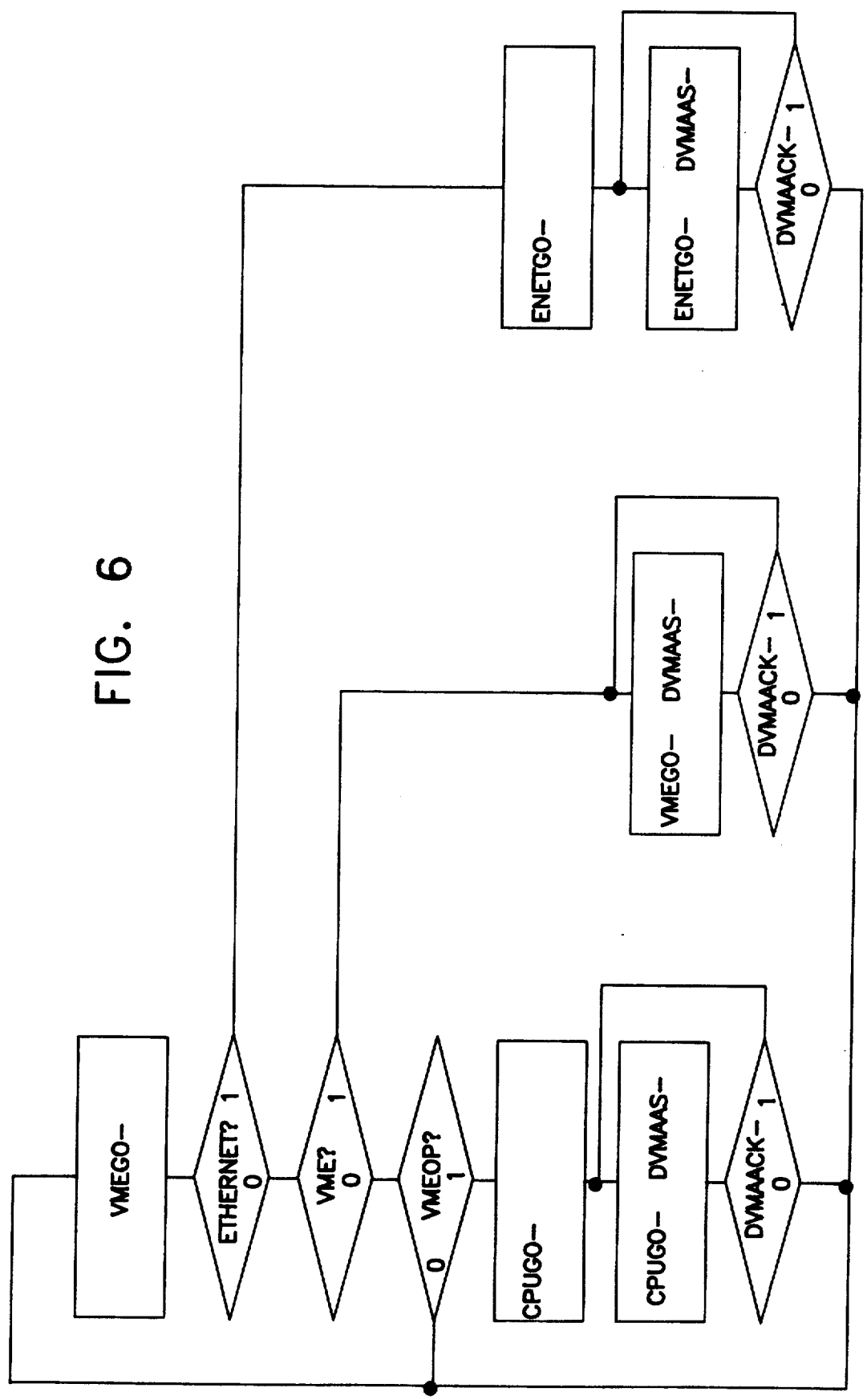
FIG. 6 describes the arbitration of the I/O buses in response to three request types: an Ethernet request, a VME request, and a VMEOP (VME Master) request from the CPU.

FIG. 5 describes the basic operation of VMEbus Master cycles with loopback controls. If loopback is enabled, as indicated by the ENLOOP bit of the System Enable Register, and the CPU initiates a VMEbus Master cycle, as indicated by the CPU address being within the range described as VMEOP in FIG. 3a, then the system logic will generate a VMEOP signal to the I/O Cache Bus Arbiter, FIG. 6. This signal will cause the arbiter to grant bus mastership to the CPU, as shown in FIG. 6. It will remain as I/O bus master until the cycle completes, as indicated by the signal DVMAACK—.

As indicated in FIG. 5, the processor read/write signal, P_READ, determines whether the VMEbus Master cycle is handled as a cycle reading from the VMEbus to the CPU, or a cycle writing to the VMEbus from the CPU. For a write cycle, with P_READ not asserted, FIG. 5 controls wait until the VMEbus arbiter, shown in FIG. 7, grants VMEbus bus mastership. This mastership is shown as the states MASTER and MST_NULL in FIG. 7. Once the arbiter reaches the MASTER state, it asserts the signal AEN-, which allows the Master write cycle in FIG. 5 to proceed to the state where the clock signal VMECKDO is asserted, clocking the write data into the VMEbus transceiver registers, as shown in the figure for the I/O Cache Detail. As shown in this drawing, if AEN is asserted and P_READ is inactive, then the VMEbus transceiver drives the VMEbus with the clocked data. Although not shown in this drawing, a signal similar to VMECKDO also captures the VMEbus master address in VMEbus Master address buffers.

In FIG. 5, after setting the internal signals VMEWRDO and VME_GTDS, the state machine tests ENLOOP. If this is active, then the clock signal VMECKDI is asserted to clock the data on the VMEbus into the input transceivers. Since this is exactly, in an error free system, the data driven by the system's VMEbus data transceivers, the system now has the loopback write data captured in the VMEbus input buffers. Similarly the address which is driven onto the VMEbus address bus by the system's address buffers is also captured in DVMA address input buffers by the clock VMECKDI.

Figure 8:
FIG. 8 is a diagram showing the VME arbiter signal generation with loopback controls.
Figure 8:
Figure 8:
Figure 8:
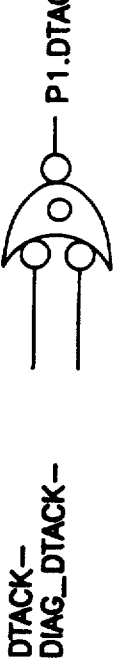
Figure 9A:
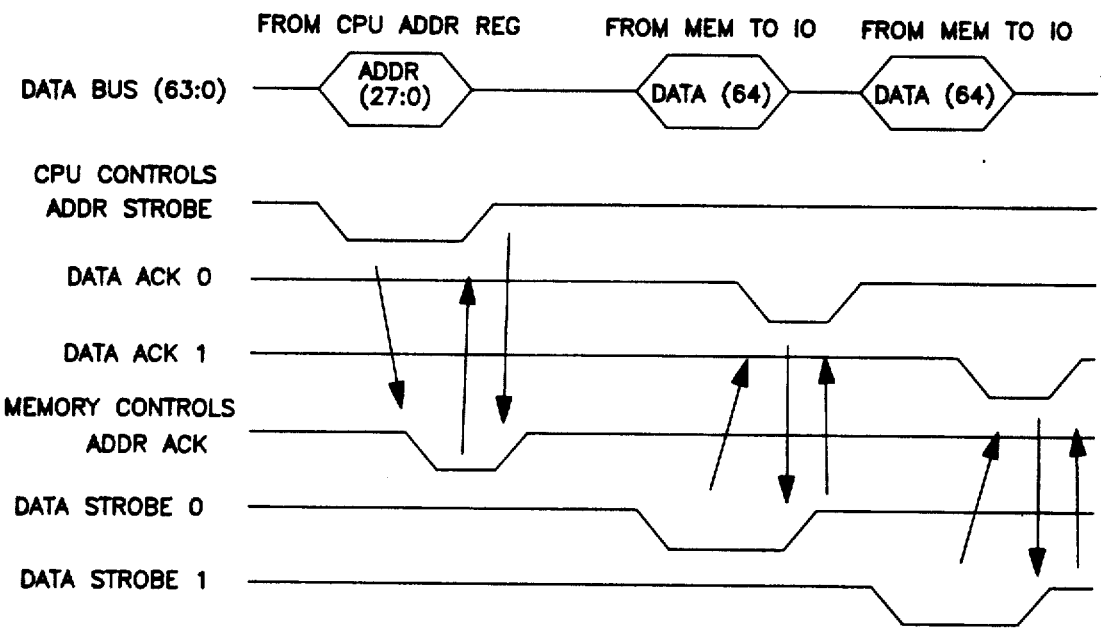
FIGS. 9a and 9b comprise parts of a single timing diagram for the memory data bus I/O transfers.
Figure 9A:
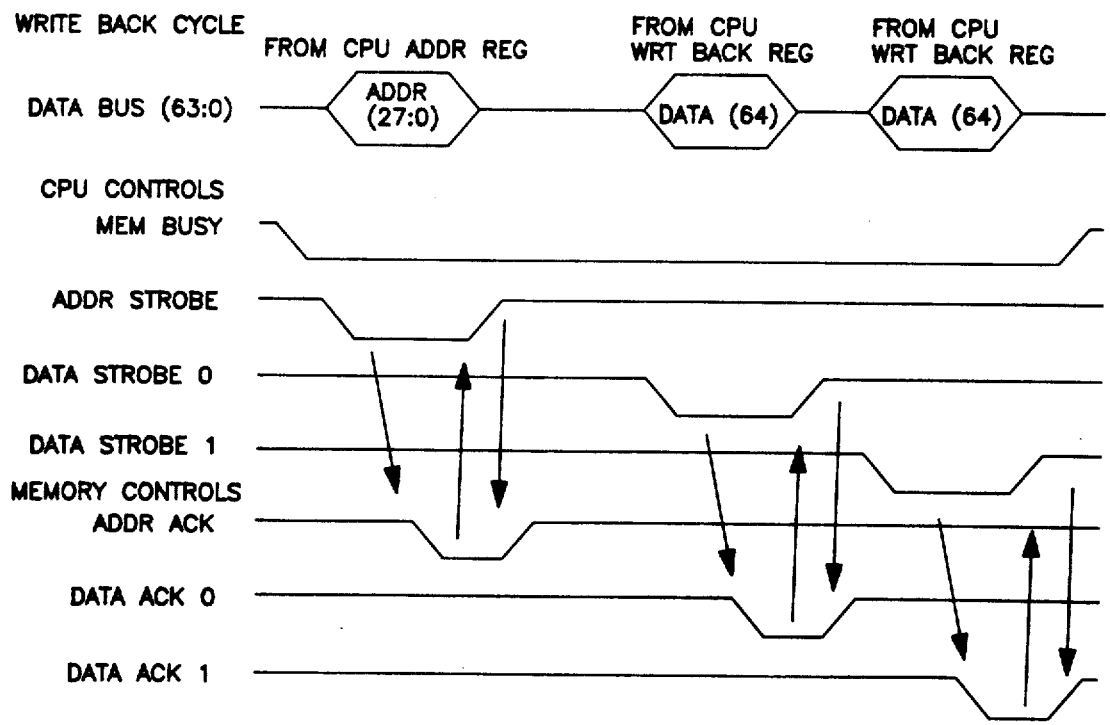
Figure 9B:
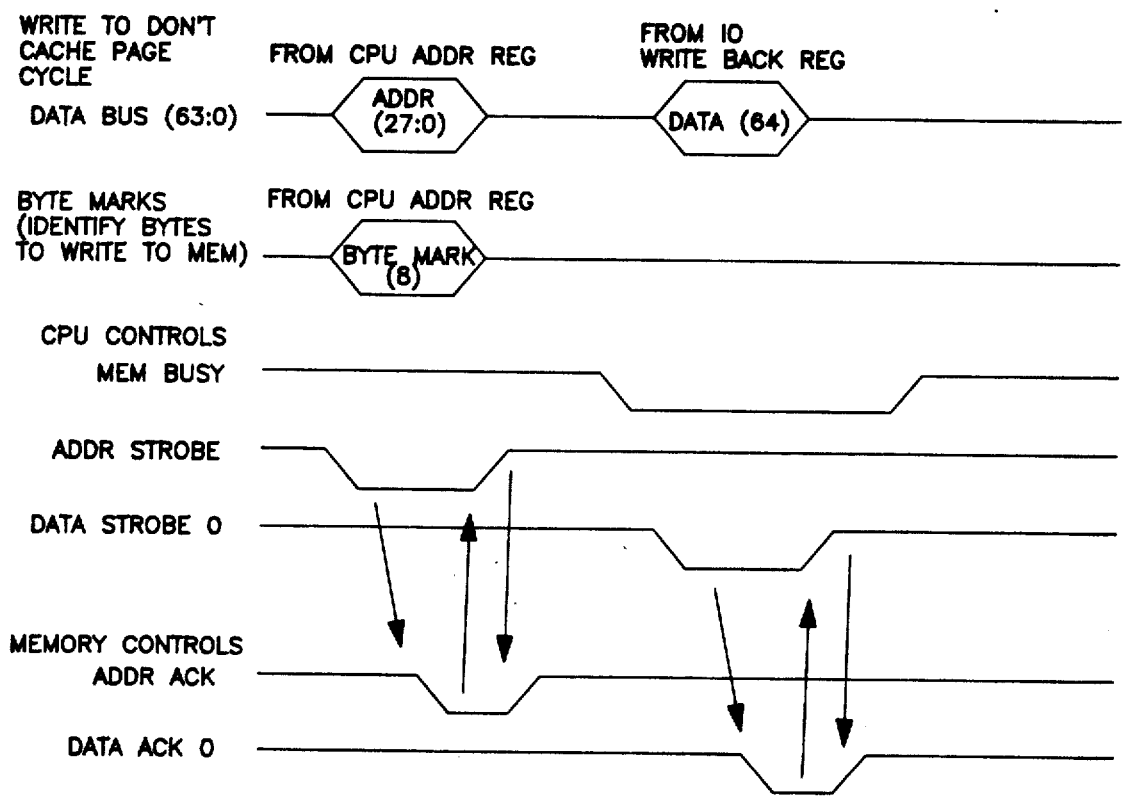
Figure 10:
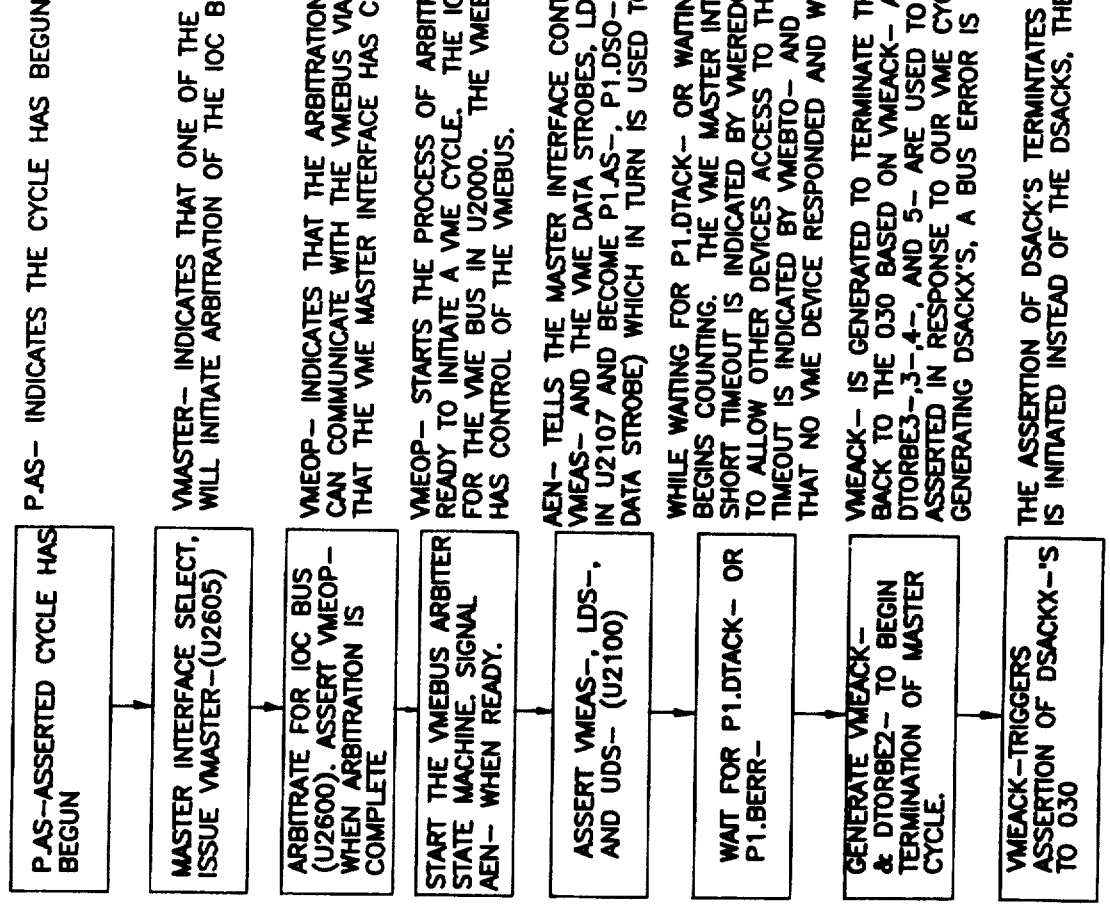
FIG. 10 is a diagram outlining the operation of the VME master interface.
Figure 11:
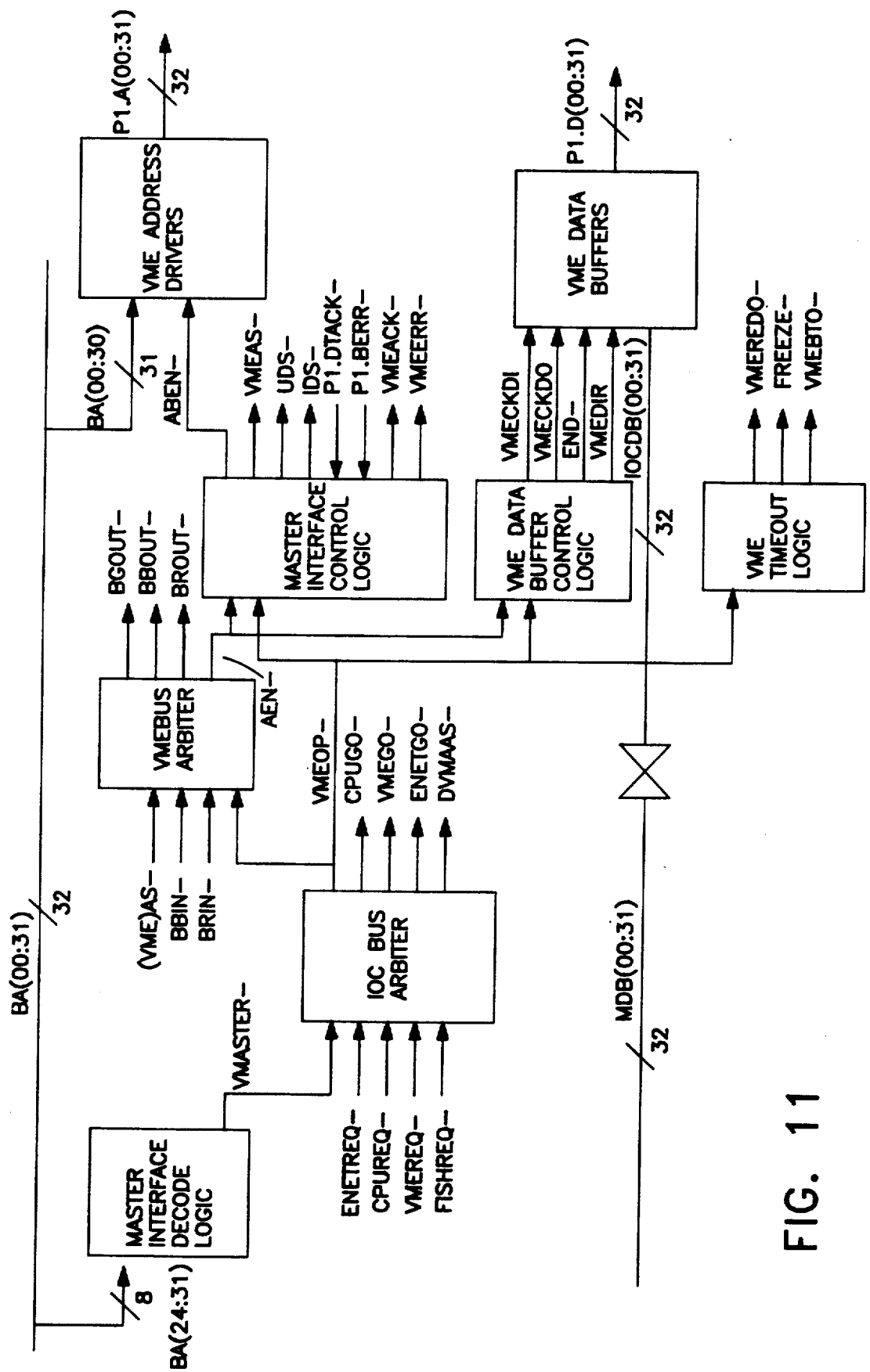
FIG. 11 is a block diagram of the VME master interface.
Figure 12:
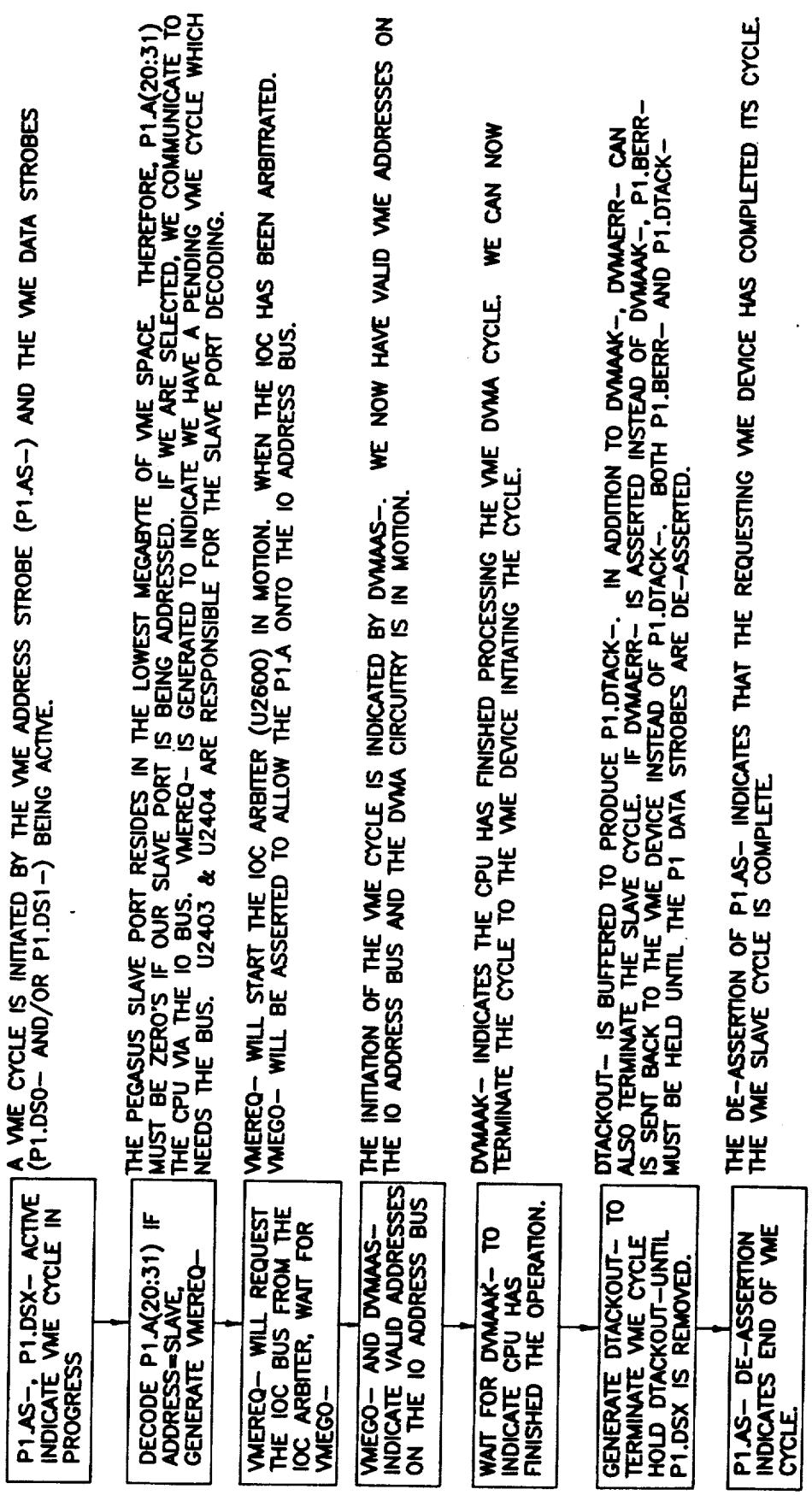
FIG. 12 is a diagram outlining the operation of the VME slave interface.

On a VMEbus master read cycle, as shown in FIG. 5, the signal ENLOOP is tested to determine whether the clock VMECKDI should be asserted. If ENLOOP is active, then the clock VMECKDI is not asserted. This causes the read cycle to proceed to read back to the CPU the data which had been captured the previous time that VMECKDI had been asserted. In the case of loopback testing, this will generally either be the previous VMEbus Master write cycle (if DVMA is disabled) or the previous DVMA read cycle (if DVMA is enabled). For both master read and master write cycles, FIG. 5 shows that the state machine waits in a loop until VMEOP is deasserted. For a normal, non-loopback VMEbus cycle, the signal VMEOP is deasserted as a result of a response on the VMEbus, either a P1.DTACK (acknowledge), a P1.BERR (bus error), or an internally generated timeout. For a loopback cycle, the loopback controls generate a DIAG_DTACK signal (not shown) which, in turn, causes a P1.DTACK signal to be generated and the bus cycle to terminate. (The generation of P1.DTACK from DIAG_DTACK is shown in FIG. 8.

Loopback Operation: DVMA Cycles

As shown in FIG. 5, the start of any DVMA cycle depends on the assertion of the VMEGO signal. This signal is asserted in FIG. 6, the I/O Bus Arbiter, in response to a VME signal. For loopback cycles, this VME signal results from decoding a DVMA address on the VMEbus, as shown in the FIG. 3b, together with an asserted VMELOOP control signal.

Figure 4:
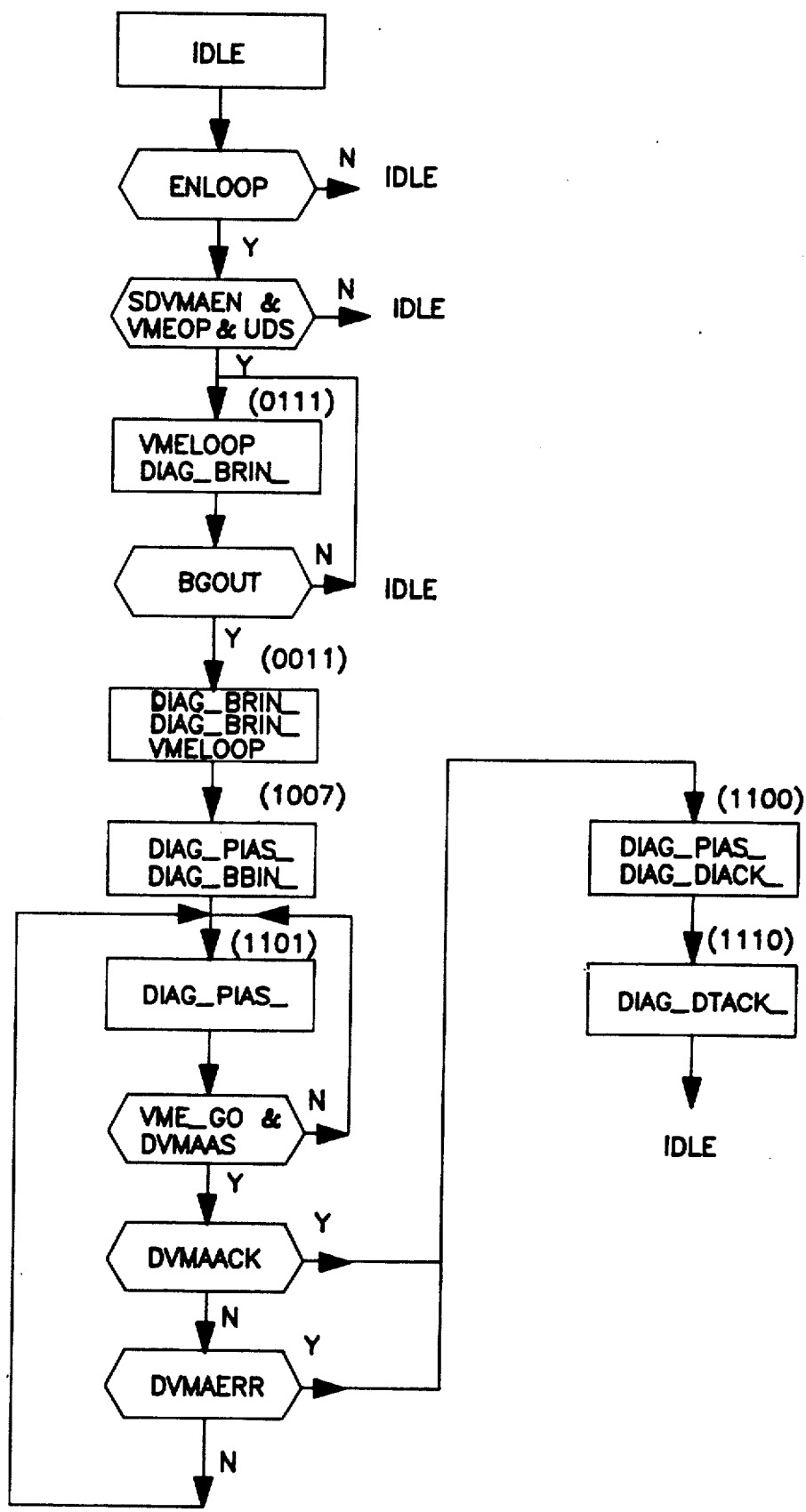
FIG. 4 describes the generation of certain signals used in the VMEbus Arbiter and for VMEbus control when loopback is enabled, as indicated by the signal ENLOOP.

The VMELOOP control signal is shown asserted in FIG. 4, when loopback is enabled, as a result of three signals being active: SDVMAEN, the DVMA Enable bit from the System Enable Register; VMEOP, the VMEbus master cycle signal; and UDS, an internal signal for generating a VMEbus upper data strobe. This last signal is asserted for VMEbus master cycles after the CPU has received VMEbus mastership from the VMEbus arbiter.

These same conditions cause a loopback diagnostic VMEbus request signal, DIAG_BRIN—, to be asserted in FIG. 4. DIAG_BRIN— causes a BRIN bus request signal to be generated. This signal to the VMEbus arbiter, shown in FIG. 7, will cause the arbiter to transition from the MST_NULL state to the YLD_GRT1 and YLD_GRT2 states, and then to the BUSGRANT state. (The following signals are refered to in the arbiter as affecting the above state transition: RMW—, Read-Modify-Write, an inactive signal for loopback; ASEL—, Address Select, active when the loopback master cycle gains bus mastership; P1.AS—, the VMEbus Address Strobe, active for until the DIAG_DTACK— signal is asserted. This will cause P1.AS— to deassert, causing the transition from state YLD_HOLD to YLD_GRTI in FIG. 7.)

Figure 7:
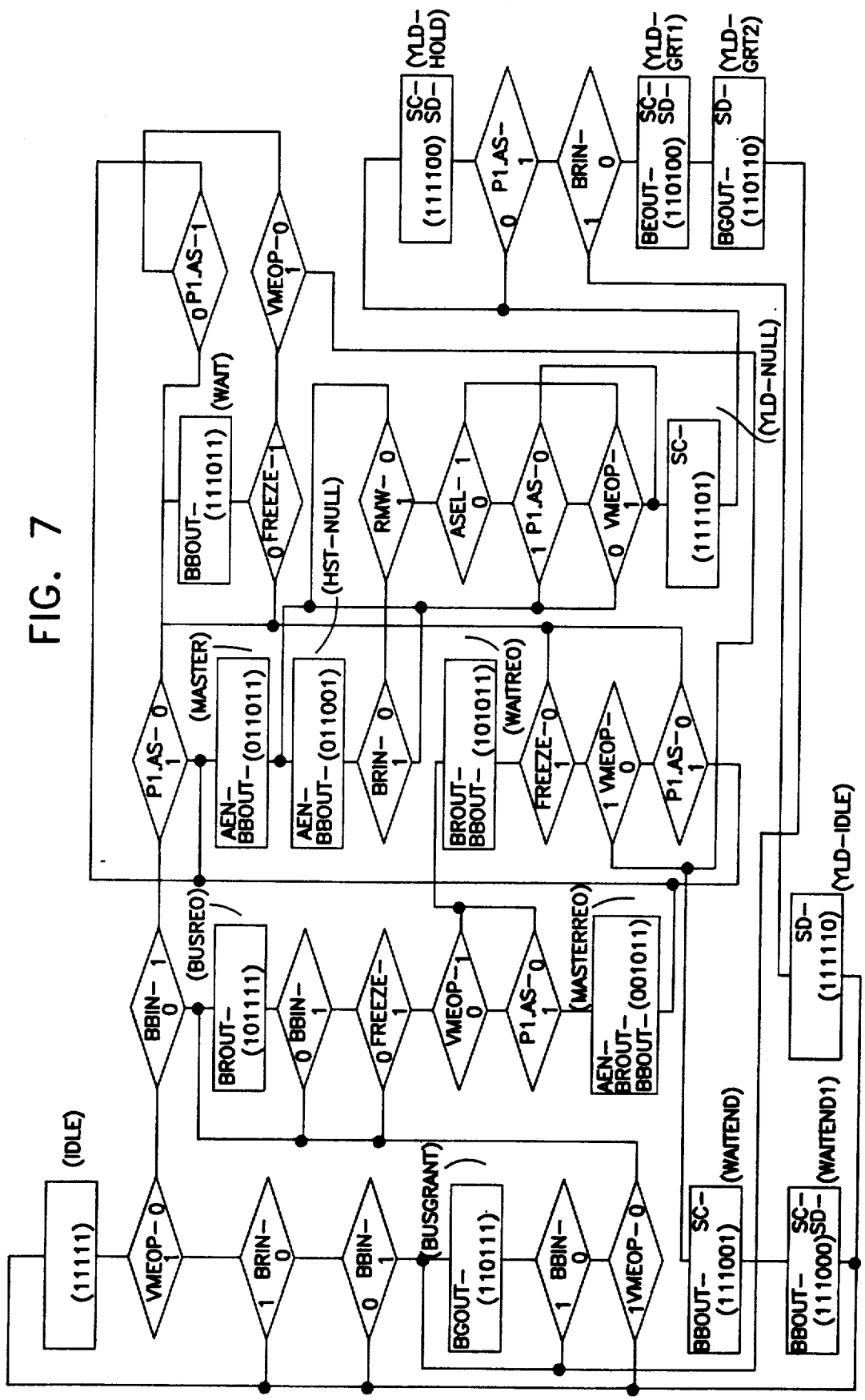
FIG. 7, describes the operation of the VMEbus arbiter.

The states YLD_GRT1, YLD_GRT2, and BUSGRANT cause the signal BGOUT— to be asserted in FIG. 7. In FIG. 4, BGOUT asserted causes a state transition so that the signals DIAG_BBIN— and DIAG_P1AS— become asserted. DIAG_BBIN—, in turn, sets BBIN—, and DIAG_P1AS— sets P1.AS— for loopback cycles. Asserting BBIN— indicates to the VMEbus arbiter that the arbitration is complete: the loopback DVMA cycle now has control of the VMEbus. The BBIN— signal being asserted causes the VMEbus arbiter in FIG. 7 to transition from the BUSGRANT state back to the IDLE state.

In FIG. 4, the signal DIAG_P1AS— will remain asserted so long as the I/O Cache Bus Arbiter, FIG. 6, asserts VMEGO— and DVMAAS—. These DVMA control signals will remain active until the I/O Cache control logic has completed the DVMA cycle. The completion is indicated by the assertion of the acknowledge control signal DVMAACK-. Typically, this signal is asserted on DVMA read cycles when the operation of reading data from the I/O Cache or main memory is complete and data is ready at the VMEbus interface. On DVMA write cycles, DVMAACK— is asserted when the DVMA data from the VMEbus interface is written—either into the I/O cache, the Central Cache, or into Main Memory. When DVMAACK— is asserted, then the state machine in FIG. 4 will complete the loopback bus cycle by asserting DIAG_DTACK— for two cycles while deasserting DIAG_P1AS—. DIAG_DTACK— generates the VMEbus control signal P1.DTACK—, satisfying the VMEbus protocol for completing a bus cycle.

Controls for clocking the DVMA data during loopback bus cycles are shown in FIG. 5. Whether the VMEbus cycle is a read cycle or write cycle is indicated by the internal control signal B_READ. In loopback cycles, this signal is set from the VMEbus control signal P1.READ, which is in turn set from the P_READ signal from the CPU.

If B_READ is inactive while VMEGO is asserted, indicating a DVMA write cycle, then ENLOOP is tested in FIG. 5 to control the clocking of data. If ENLOOP is active, then no clock is asserted to clock incoming data from the VMEbus. The result of not asserting a clock is that the data captured by the previous assertion of VMECKDI remains in the VMEbus data transceivers. VMECKDI had been asserted in the loopback master write cycle just completed to capture the loopback data from the CPU. So the end result in the generation of a DVMA loopback bus cycle with both the data and address from the CPU.

If B_READ is active while VMEGO is asserted, indicating a DVMA read cycle, then data from the I/O Cache and memory subsystem is captured in the VMEbus transceivers by asserting VMECKDO for both loopback cycles and normal VMEbus DVMA cycles. The combination of VMEGO— active and B_READ active causes the transceivers to be enabled so that the data is driven onto the VMEbus. For loopback cycles, the active ENLOOP signal from the System Enable Register causes this VMEbus data to be captured in the input transceivers by asserting the clock VMECKDI. Once this data is captured, it can be read by the CPU through a subsequent VMEbus read loopback bus cycle.

Attached hereto as an appendix is an exemplary routine for a VME Loopback test and a VME Loopback and DVMA Test.

APPENDIX

1. VME LOOPBACK TEST

Verify that the VME loopback function works for 32-bit writes and reads.
(1) Turn off EN_CACHE,EN_IOCACHE, EN_DVMA,EN_VME_LOOP in System Enable Register.
(2) For each test addr
(0x0,0x4,0x8,0x10,0x20,0x00040000, . . . ,0x00080000).

APPENDIX-continued

For each test data (0x0,0x1,0x2,. . . . ,0x80000000) at each test_addr.
(a) Turn on VME-loopback in System Enable Register.
(b) Write test_data to test_addr + 0x80000000 (test_addr + DVMA_offset).
(c) Read data from test_addr + 0x80000000 (test_addr + DVMA_offset).
(d) Read data from test_addr + 0x80000000 (test_addr + DVMA_offset). (Second read is necessary to get data into CPU register file).
(e) Turn off VME-loopback in System Enable Register.
(f) Verify that the data read is the same as the data that was written.
Upon error: loop through steps (a) → (f) with constant test_addr and test_data.

2. VME LOOPBACK AND DVMA TEST

Verify that the VME loopback function works for 32-bit DVMA writes and reads.
(1) Turn off EN_CACHE,EN_IOCACHE, EN_DVMA,EN_VME_LOOP in System Enable Register.
(2) For each test address (0x0,0x4,0x8,0x10,0x20,0x00040000, . . . ,0x00080000).
For each data pattern (0x0,0x1,0x2,. . . . ,0x80000000) at each test addr.
(a) Write IO Mapper entry for test_addr (turn on IO_DT and IO_EN bits).
(b) Turn on DVMA, VME-loopback in System Enable Register.
(c) Write test_data to test_addr + 0x80000000 (test_addr + DMVA_offset).
(d) Read data from test_addr + 0x80000000 (test_addr + DVMA_offset).
(e) Turn off DVMA in System Enable Register.
(f) Read data from test_addr + 0x80000000 (test_addr + DVMA_offset). (Second read is necessary to get data into CPU register file).
(g) Turn off VME-loopback in System Enable Register.
(h) Verify that the data read is the same as the data that was written.
Upon error: loop through steps (a) → (h) with constant test_addr and test_data.

We claim:

1. In a workstation or server having a central processing unit (CPU) and a standard system bus interface, the improvement comprising:
   means for the CPU to enable and disable a loopback test mode for the system bus interface;
   means for the CPU, with the loopback test mode enabled, to functionally test data paths and controls utilized to perform programmed I/O accesses to the standard system bus interface.

2. The improvement of claim 1 for a workstation or server supporting direct memory access (DMA) to system memory, the improvement further comprising;
   means for the CPU to enable and disable DMA transfers in addition to a loopback test mode for the system bus interface; and,
   means for the CPU, with loopback mode set and with DMA transfers disabled, to functionally test all standard system bus address and data modes supported by the standard system bus for a master interface without testing actual system bus devices which support the standard system bus address and data modes.

3. The improvement of claim 1 for a workstation or server supporting direct memory access (DMA) to system memory, the workstation or server further comprising a main memory and a cache subsystem coupled between the CPU and the main memory, the improvement further comprising;
   means for the CPU to enable and disable DMA transfers in addition to a loopback test mode for the system bus interface; and,
   means for the CPU, with loopback mode set and DMA transfers enabled, to functionally test data paths and controls utilized to perform DMA bus cycles from the system bus interface to the cache subsystem and to the main memory.

4. The improvement of claim 1 for a workstation or server supporting direct memory access (DMA) to system memory, the improvement further comprising;
   means for the CPU to enable and disable DMA transfers in addition to a loopback test mode for the system bus interface; and,
   means for the CPU, with loopback mode set and DMA transfers enabled, to functionally test data paths and controls utilized to perform DMA bus cycles from the system bus interface to an I/O subsystem and main memory.

5. The improvement of claim 1 for a workstation or server supporting direct memory access (DMA) to system memory, the improvement further comprising;
   means for the CPU to enable and disable DMA transfers in addition to a loopback test mode for the system bus interface; and,
   means for the CPU, with loopback mode set and with DMA transfers enabled, to functionally test all standard system bus address and data modes supported by the standard system bus for a slave system bus interface without testing actual system bus devices which support the standard system bus address and data modes.

6. The improvement of claims 2, 3, 4 or 5 wherein the direct memory access (DMA) to system memory is a direct virtual memory access (DVMA) to main memory.

7. In a workstation or sever supporting direct memory access (DMA) to system memory, the workstation or sever comprising a central processing unit (CPU), a main memory and a cache subsystem coupled between the CPU and the main memory, and a standard system bus interface coupled to the CPU, the improvement comprising:
   means for the CPU to enable and disable a loopback test mode for the system bus interface;
   means for the CPU, with the loopback test mode enabled, to functionally test data paths and controls utilized to perform programmed I/O accesses to the standard system bus interface;
   means for the CPU to enable and disable DMA transfers in addition to a loopback test mode for the system bus interface; and,
   means for the CPU, with loopback mode set and DMA transfers enabled, to functionally test data paths and controls utilized to perform DMA bus cycles from the system bus interface to the cache subsystem and to the main memory.

8. The improvement of claim 7 wherein the direct memory access (DMA) to system memory is a direct virtual memory access (DVMA) to main memory.

9. The improvement of claim 7 for a workstation or server supporting direct memory access (DMA) to system memory, the improvement further comprising;
   means for the CPU, with loopback mode set and with DMA transfers disabled, to functionally test all standard system bus address and data modes supported by the standard system bus for a master interface without testing actual system bus devices which support the standard system bus address and data modes.

10. The improvement of claim 9 wherein the direct memory access (DMA) to system memory is a direct virtual memory access (DVMA) to main memory.

11. The improvement of claim 7 for a workstation or server supporting direct memory access (DMA) to system memory, the improvement further comprising;
means for the CPU, with loopback mode set and DMA transfers enabled, to functionally test data paths and controls utilized to perform DMA bus cycles from the system bus interface to an I/O subsystem and main memory.

12. The improvement of claim 11 wherein the direct memory access (DMA) to system memory is a direct virtual memory access (DVMA) to main memory.

13. The improvement of claim 7 for a workstation or server supporting direct memory access (DMA) to system memory, the improvement further comprising;
means for the CPU, with loopback mode set and with DMA transfers enabled, to functionally test all standard system bus address and data modes supported by the standard system bus for a slave system bus interface without testing actual system bus devices which support the standard system bus address and data modes.

14. The improvement of claim 13 wherein the direct memory access (DMA) to system memory is a direct virtual memory access (DVMA) to main memory.

15. In a workstation or sever comprising a central processing unit (CPU), a mean memory and a cache subsystem coupled between the CPU and the main memory, and a standard system bus interface coupled to the CPU, a loopback test method comprising the steps of:
providing means for the CPU to enable and disable a loopback test mode for the system bus interface;
enabling the loopback test mode;
with the loopback test mode enabled, the CPU functionally testing data paths and controls utilized to perform programmed I/O accesses to the standard system bus interface.

16. The loopback test method as set forth in claim 15 further comprising the steps of:
providing means for the CPU to enable and disable Direct Memory Access (DMA) transfers in addition to a loopback test mode for the system bus interface;
enabling DMA transfers;
with loopback mode set and DMA transfers enabled, the CPU functionally testing data paths and controls utilized to perform DMA bus cycles from the system bus interface to the cache subsystem and to the main memory;
with loopback mode set and DMA transfers enabled, the CPU functionally testing data paths and controls utilized to perform DMA bus cycles from the system bus interface to an I/O subsystem and main memory;
with loopback mode set and with DMA transfers enabled, the CPU functionally testing all standard system bus address and data modes supported by the standard system bus for a slave system bus interface without testing actual system bus devices which support the standard system bus address and data modes.

17. The loopback test method as set forth in claim 16 further comprising the steps of:
disabling the DMA transfers;
with loopback mode set and with DMA transfers disabled, the CPU functionally testing all standard system bus address and data modes supported by the standard system bus for a master interface without testing actual system bus devices which support the standard system bus address and data modes.

* * * * *

UNITED STATES PATENT AND TRADEMARK OFFICE
CERTIFICATE OF CORRECTION

PATENT NO. : 5,161,162
DATED : November 3, 1992
INVENTOR(S) : Watkins et al.

It is certified that error appears in the above-identified patent and that said Letters Patent is hereby corrected as shown below:

Please delete Figure 2a of the drawing sheets and insert attached Figure 2a.

In column 19, claim 15 at line 34, please delete " mean " and insert -- main --..

Signed and Sealed this

Sixteenth Day of September, 1997

Attest:

BRUCE LEHMAN

Attesting Officer

Commissioner of Patents and Trademarks